(12) United States Patent  
Sato et al.

(10) Patent No.: US 6,445,666 B1
(45) Date of Patent: Sep. 3, 2002

(54) DISK DEVICE

(75) Inventors: Masao Sato; Atsushi Michimori; Takeshi Inatani; Masaaki Takeshima; Tatsunori Fujiwara, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/669,548

(22) Filed: Sep. 26, 2000

Related U.S. Application Data

(63) Continuation of application No. PCT/JP99/02529, filed on May 14, 1999.

(30) Foreign Application Priority Data

Feb. 12, 1999 (WO) .............................. PCT/JP99/00599

(51) Int. Cl.[7] .............................................. G11B 33/02
(52) U.S. Cl. ..................... 369/77.1; 369/77.2; 369/75.2
(58) Field of Search .............................. 369/75.1, 75.2, 369/77.1, 77.2

(56) References Cited

U.S. PATENT DOCUMENTS 5,299,185 A * 3/1994 Sakurai et al. ............. 369/75.2

FOREIGN PATENT DOCUMENTS

| JP | A6223470 | 8/1994 |
| JP | A798953 | 4/1995 |
| JP | A7220355 | 8/1995 |
| JP | A9231654 | 9/1997 |

* cited by examiner

*Primary Examiner*—William Klimowicz
(74) *Attorney, Agent, or Firm*—Birch, Stewart, Kolasch & Birch, LLP

(57) ABSTRACT

A disk device is includes first support shaft which supports a retaining arm, retaining a second turntable, to reciprocate vertically and a second support arm which supports the retaining arm to rotate and refuge horizontally so that the second turntable which supports a second disk which is not stored in a cartridge and which transmits a rotational force to a second disk can be loaded and separated from a first turntable which supports a first disk and which transmits a rotational force to a first disk.

10 Claims, 41 Drawing Sheets

(a) FIRST PERIOD (b)

DISK DEVICE

CROSS-REFERENCE TO THE RELATED APPLICATION

This Application is a continuation of International Application No. PCT/JP99/02529, whose International filing date is May 14, 1999, the disclosures of which Application are incorporated by reference herein. The benefit of the filing and priority dates of the International Application is respectfully requested.

BACKGROUND OF THE INVENTION

1. Field of the Invention

The present invention relates to a disk device which can play a minidisk (MD) used in cartridge stored form and a compact disk (CD) used as a single disk not stored in a cartridge.

2. Description of the Related Art

FIG. 1 to FIG. 3 show a conventional disk device as disclosed for example in JP-A 7-220355. In the figures, reference numeral 301 denotes a sub-base supporting a spindle motor 303 and an optical pickup 305. 304 is a first turntable which is fixed to the spindle motor 303 and which rotates a minidisk (MD) 312 stored in a cartridge 311. 306 is a second turntable which is retained with a play on a retaining member 302. 308 is a clamp which is retained with a play on a clamp holder 307. 310 is a guide member which guides and retains the cartridge 311.

The retaining member 302 is retained with a buffer with respect to a housing 314. The sub-base 301 is adapted to be raised and lowered in response to fixed modes. The clamp holder 307 is adapted to approach and be separated from the retaining member 302 in response to fixed modes.

The operation of the conventional disk device will be discussed below.

When a minidisk 312 is played, firstly as shown in FIG. 1, the sub-base 301 is raised by the operation of the raising or depressing motor (hereafter elevating motor) 315 when a cartridge 311 is inserted into the guide member 310. The first turntable 304 is displaced to a position abutting with a fixed clamp area of the minidisk 312, that is to say, the position as shown in FIG. 3. In such a position, the minidisk 312 is rotated and played by the rotating spindle motor 303.

When a compact disk (CD) 313 is played which is used as a single disk not in a cartridge-stored state, the compact disk 313 is inserted into the gap between the retaining member 302 and the clamp 308. Thereafter the sub-base 301 is raised by the action of the elevating motor 315 until the first turntable 304 is in a position abutting with a fixed clamp area of the compact disk (CD) 313, that is to say, the position as shown in FIG. 2.

At this time, a depressing operation is performed on the clamp holder 307 and the second turntable 306 holds the compact disk 313. The guide member 310 performs a lateral refuging operation in order to create a space to allow the elevation of the sub-base 301. After the completion of this series of operations, the compact disk 313 is rotated and played by the rotation of the first turntable 304 and the second turntable 306 which is engaged with the first turntable 304 due to the rotation of the spindle motor 303.

FIG. 4 and FIG. 5 show a conventional disk device as disclosed for example in JP-A 9-231654. In the figures, 321 denotes a base mounting an optical pickup 325 and a spindle motor 323. 324 denotes a first turntable which is fixed to the spindle motor. 326 is a second turntable which is retained with a play on a retaining arm 322. The retaining arm 322 is retained to rotate freely on a shaft 327 fixed to the base 321 and is retained to slide freely in a perpendicular direction. 328 denotes a gear section which is formed on the retaining arm 322. The gear section 328 transmits the drive force of the drive motor 329 through the gears 330, 331. 332 denotes a triangular cam provided on the base 321. A boss 333 is formed on the rear face of the retaining arm 322 opposite the triangular cam 332.

The operation of the conventional disk device will be described below.

When a compact disk is played, the compact disk is loaded onto the second turntable 326 which is loaded onto the first turntable 324. The compact disk is held on the second turntable 326 by a clamp (not shown) and the spindle motor 323 is rotated to perform the playing operation.

When a minidisk is played, a drive motor 329 is rotated when the insertion of a cartridge is detected. That rotational force is transmitted through the gears 330, 331, 328 to rotate the retaining arm 322 in the direction designated by the arrow Y. Together with this rotational operation, as shown in FIGS. 5(a)–(c), the second turntable 326 which is retained on the retaining arm 322 separates from the first turntable 324 while rotating. The boss 333 elevates along the inclined face of the triangular cam 332. After the boss 333 passes the apex of the triangular cam 332, the retaining arm 322 is depressed to refuge rotation and stops at a position which prevents planar interference with the cartridge.

Since the conventional disk device is constructed in such a manner, when playing either a minidisk or a compact disk for example, in the former example of a conventional disk device, the problem has arisen that the width of the device can not be downsized since the first turntable 304, the second turntable 306 and the clamp 308 are layered vertically.

Furthermore when raising operations for the second turntable 326 are performed in conjunction with rotation operations on the retaining arm 322 in the latter example of a conventional disk device, the possibility exists that accurate separation and linkage of the engagement section will not be realized as a result of the centering of the first turntable 324 and the second turntable 326. Furthermore the problem has arisen that the highly accurate engagement section may be damaged due to the turntables 324, 326 being on an angle when linking or separating.

Furthermore the problem has arisen that the latter example of a convention disk device can not be downsized as the second turntable 326 is refuged to a position which does not interfere in a planar direction with the cartridge of the minidisk which thus increases the dimensions of the device with respect to depth.

SUMMARY OF THE INVENTION

The present invention is proposed to solve the above problems and has the object of providing a disk device with reduced dimensions with respect to height and depth and which enables accurate loading and separation of a second turntable.

The present invention has the further object of providing a disk provided with a simplified driving mechanism for a second turntable.

The present invention has the further object of providing a disk device with reduced dimensions with respect to height and depth which ensures refuging of a CD clamp arm and CD adapter arm into the device to a position not impeding a loaded minidisk and, in particular, by refuging the CD clamp arm and CD adapter arm to displace below a loaded minidisk.

The disk device of the present invention enables the reduction of dimensions of the device with respect to height and depth in a disk device having a first turntable which supports a first disk which is stored in a cartridge and which transmits a rotational force to this first disk, a second turntable which can be loaded onto and separate from the first turntable, which supports a second disk which is not loaded in a cartridge and which transmits a rotational force to the second disk and a spindle motor which rotates the first turntable wherein the disk device is characterized by a retaining arm which retains the second turntable with play, a first shaft which supports the retaining arm to reciprocate vertically so that the second turntable is loaded onto and separates from the first turntable and, a second shaft which supports the retaining arm to rotate and refuge in a planar direction.

The disk device of the present invention enables accurate loading and separation of the second turntable by the provision of a first drive plate which is driven when a first disk is loaded, an arm raising means which raises the retaining arm in a first operational period after the initiation of the first drive plate and which separates the second turntable from the first turntable and an arm rotation means which rotates the retaining arm in a planar direction in a subsequent second operational period of the first drive plate and which refuges the second turntable to a position which does not impede the playing of a first disk.

The disk device of the present invention enables the downsizing of the device with respect to the dimensions of height and depth and enables the accurate loading and separation of the second turntable by the provision of an arm depression means which depresses the retaining arm and which refuges at least a section of the second turntable to a position lower than a first disk after the retaining arm has been rotated in a planar direction and. the second turntable has been refuged to a position which does not impede the first turntable.

The disk device of the present invention enables the simplification of the drive mechanism of the second turntable by the provision of a clamp arm which retains the clamp which pressures and holds a second disk on the second turntable, a third shaft which is formed on an end of the clamp arm at a position which approximately corresponds to the second shaft of the retaining arm and engaging sections provided on the retaining arm and the clamp arm which mutually engage when the retaining arm is raised.

When the case-stored recording medium disk loading mechanism draws a case-stored recording medium disk to a fixed position in the device and loads the disk onto a turntable, the disk device of the present invention is adapted to comprise a drive plate which displaces in a linear direction, a case-stored recording medium disk loading mechanism which draws the case-stored recording medium disk to a fixed position and loads the disk onto a turntable due to the displacement of the dive plate, a non-case-stored recording medium disk loading mechanism which loads a non-case-stored recording medium disk taken up to a fixed position in the device onto a turntable and which supports the non-case-stored recording medium disk clamp and the non-case-stored recording medium disk adapter respectively to displace vertically and rotate, a cam mechanism which layers the non-case-stored recording medium disk clamp and the non-case-stored recording medium disk adapter together due to linear displacement of the drive plate, a depth displacement mechanism which, together with the displacement of the drive plate, displaces the non-case-stored recording medium disk clamp and the non-case-stored recording medium disk adapter layered together by the cam mechanism in an inward direction of the device which does not impede loading of a case-stored recording medium disk onto a turntable, and a refuge mechanism which displaces and refuges the non-case-stored recording medium disk clamp and the non-case-stored recording medium disk adapter, which are displaced into the device by the depth displacement mechanism, in a direction lower than the case-stored recording medium disk loaded onto a turntable. Thus dimensions with respect to depth and height can be downsized, the non-case-stored recording medium disk clamp and the non-case-stored recording medium disk adapter can be layered together and displaced into the device by the linear displacement of the drive plate and furthermore can be displaced and refuged lower than a case-stored recording medium disk.

The disk device of the present invention initiates linear displacement of the drive plate due to an insertion operation of a case-stored recording medium disk inserted through the disk insertion/ejection mouth and loaded onto a case-stored recording medium disk holder into the device. Thus dimensions with respect to depth and height can be downsized, a non-case-stored recording medium disk clamp and non-case-stored recording medium disk adapter can be raised above the turntable and displaced into the device due to linear displacement of the drive plate which is initiated by insertion of a case-stored recording medium disk and furthermore can be displaced and refuged lower than a case-stored recording medium disk.

The disk device of the present invention is provided with a cam mechanism which raises the non-case-stored recording medium disk adapter upwardly and which layers the adapter together with a non-case-stored recording medium disk clamp due to the linear displacement of the drive plate. Thus dimensions with respect to depth and height can be downsized and the mechanism for raising the non-case-stored recording medium disk clamp and non-case-stored recording medium disk adapter above the turntable can be simplified.

The disk device of the present invention is provided with a cam mechanism comprising a cam face forming section and a projection. The cam face forming section is formed on the drive plate performing linear displacement. The projection is provided at a position which can abut with the cam face forming section in proximity to the base of the non-case stored recording medium disk adapter arm on the tip of which the non-case stored recording medium disk adapter is formed. Thus dimensions with respect to depth and height can be downsized and the mechanism for raising the non-case-stored recording medium disk clamp and non-case-stored recording medium disk adapter above the turntable can be simplified.

In the disk device of the present invention, a depth displacement mechanism is provided with a pin formed on the drive plate which performs linear displacement and a guide hole which engages with the pin. The guide hole displaces the non-case-stored recording medium disk clamp and non-case-stored recording medium disk adapter, which are layered together by the linear displacement of the drive plate, into the device and is formed in proximity to the base of the non-case-stored recording medium disk adapter arm. Thus dimensions with respect to depth and height can be downsized and the mechanism for displacing the non-case-stored recording medium disk clamp and non-case-stored recording medium disk adapter into the device can be simplified.

In the disk device of the present invention, the non-case-stored recording medium disk loading mechanism is provided with a first arm support member which supports the non-case-stored recording medium disk clamp to displace vertically and rotate and a second arm support member which supports the non-case-stored recording medium disk adapter to displace vertically and rotate and which shares a rotation shaft with the first arm support member. The refuge mechanism has an outer displacement body which displaces towards the disk insertion/ejection mouth from within the device at the end of the linear displacement of the drive plate and a cam flap which displaces towards the disk insertion/ejection mouth from within the device due to the displacement of the outer displacement body and which lowers the position of the rotation shaft shared by the first and second arm support members. Thus dimensions with respect to depth and height can be downsized and it is possible to refuge the non-case-stored recording medium disk clamp and non-case-stored recording medium disk adapter by the linear displacement of the drive plate to a position lower than case-stored recording medium disk loaded onto a turntable.

DETAILED DESCRIPTION OF THE PREFERRED EMBODIMENTS

In order to describe the present invention in greater detail, the preferred embodiments of the present invention will be described with reference to the accompanying figures.

Embodiment 1

Figure 1:
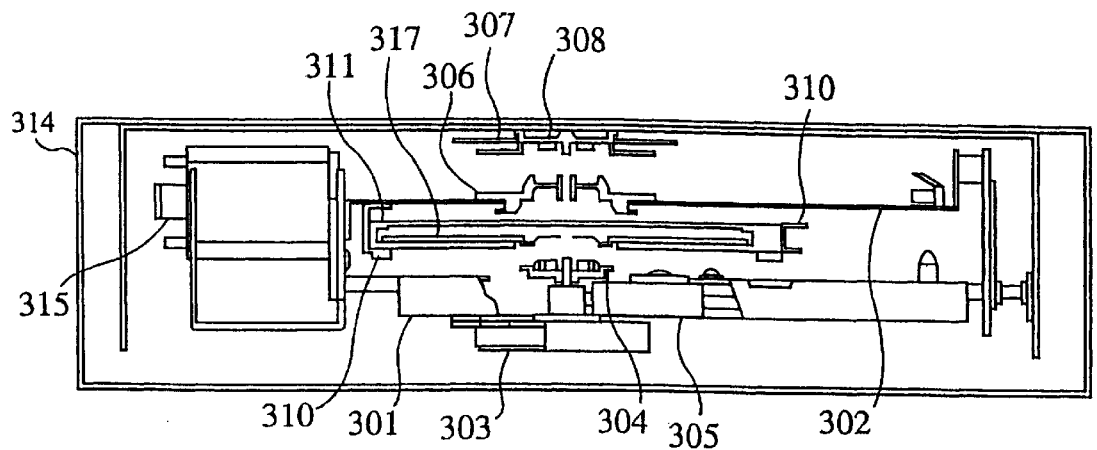
FIG. 1 shows a first conventional disk device.
Figure 2:
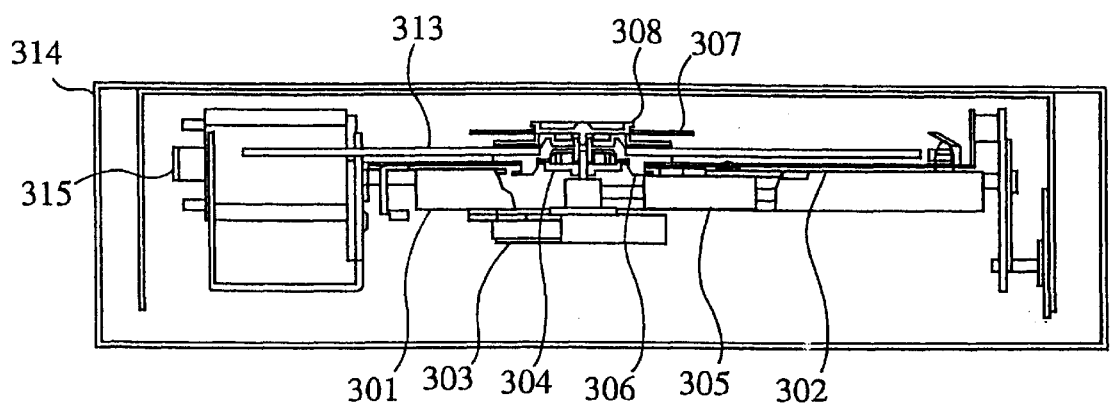
FIG. 2 shows a CD loaded into the disk device above.
Figure 3:
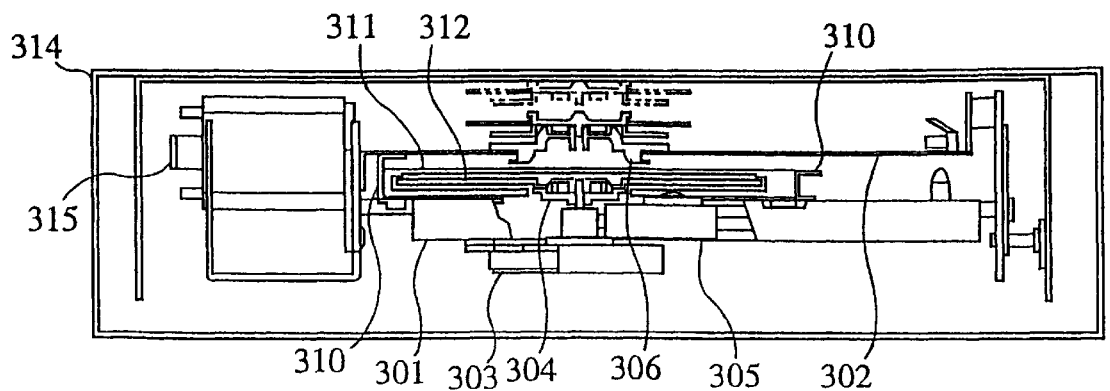
FIG. 3 shows an MD loaded into the disk device above.
Figure 4:
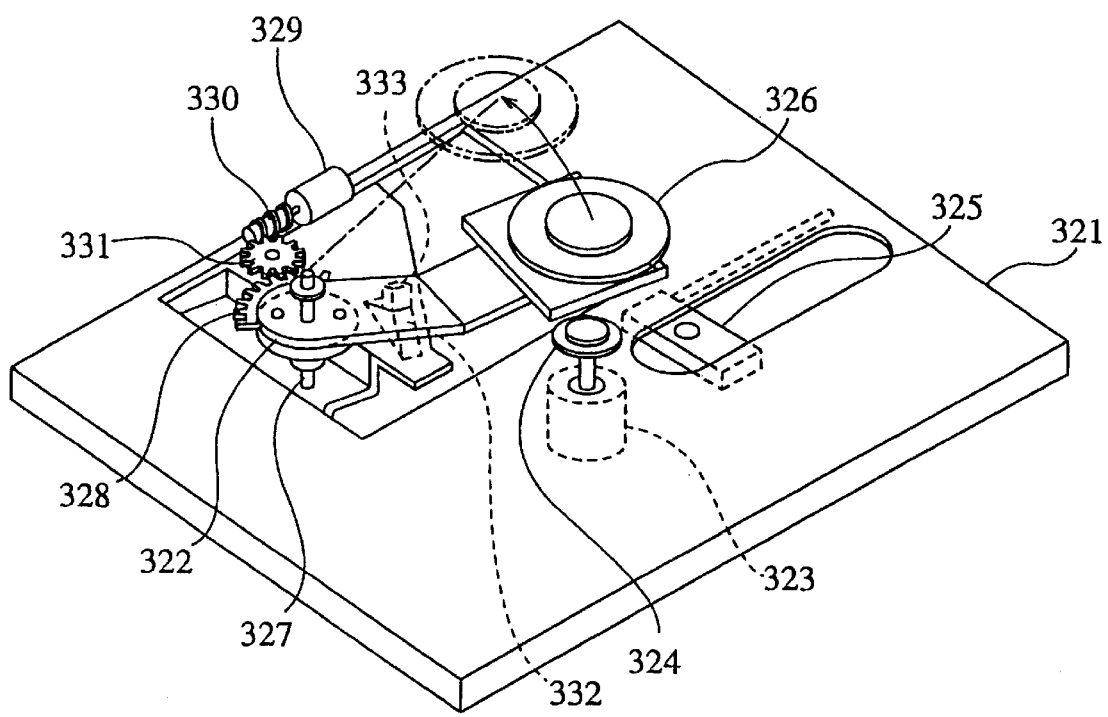
FIG. 4 shows a second conventional disk device.
Figure 5:
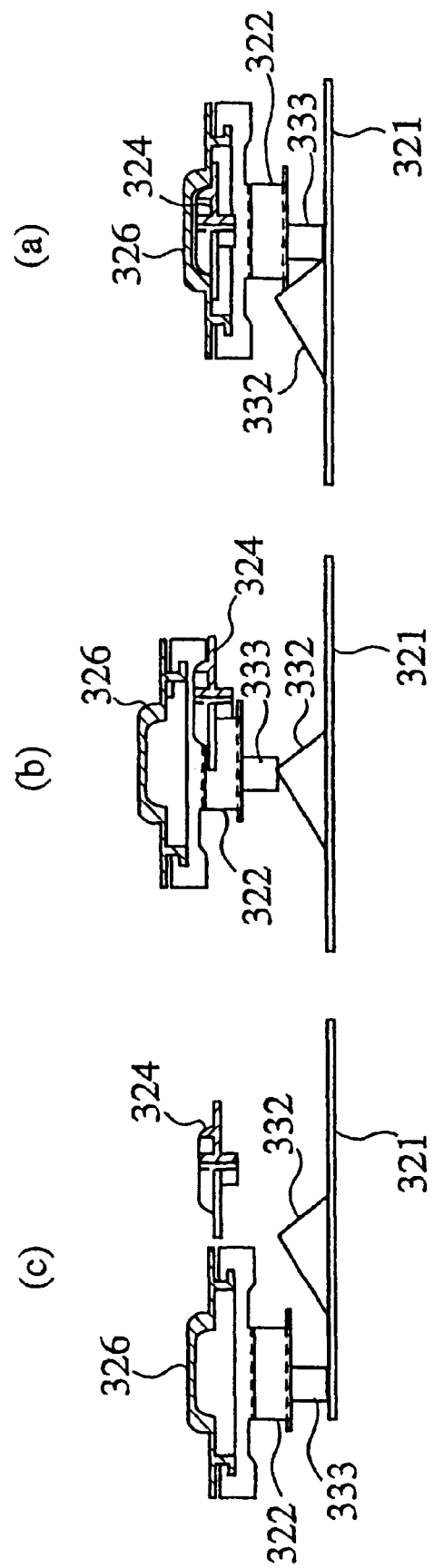
FIG. 5 describes the operation of the second disk device.
Figure 6:
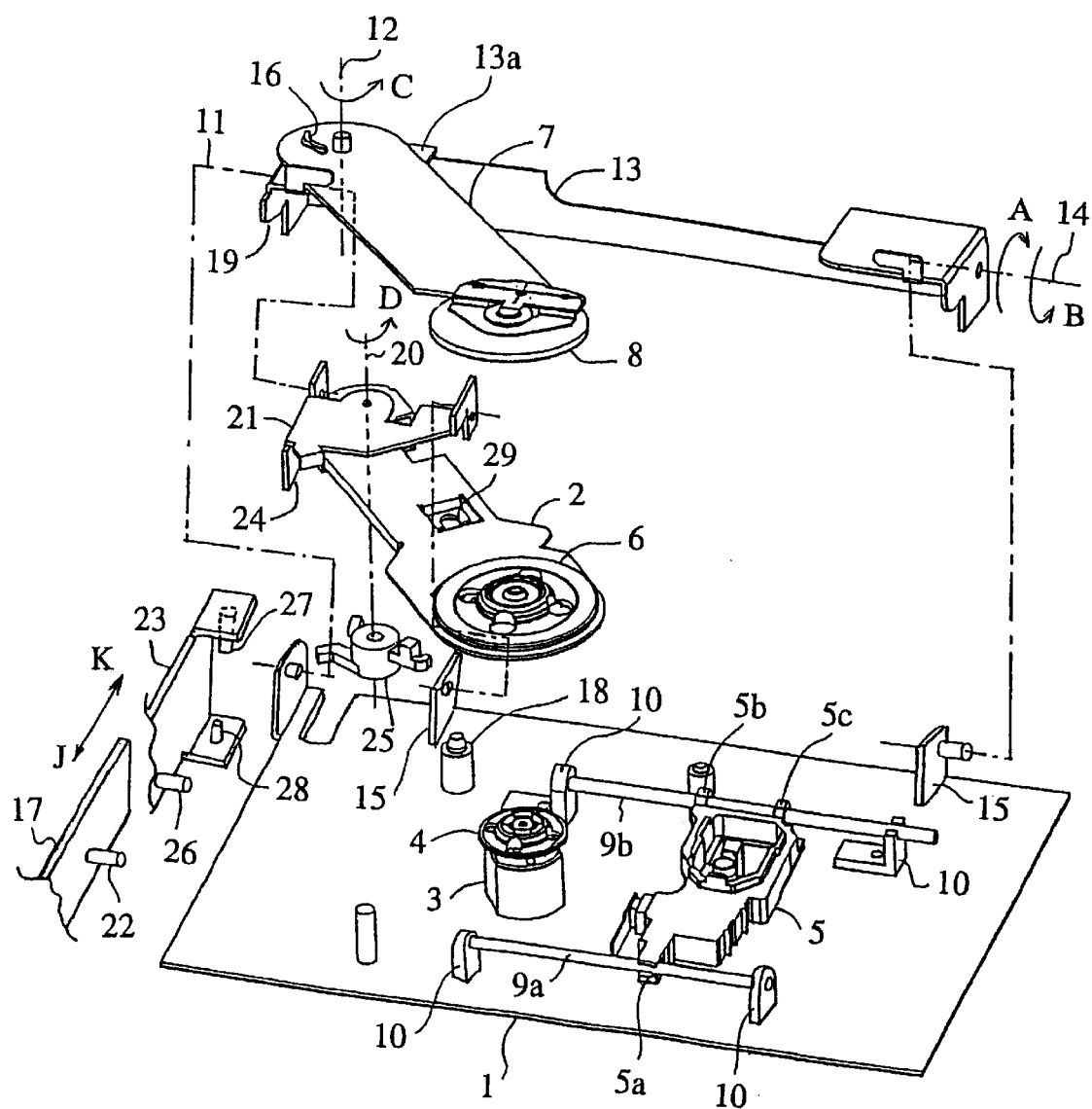
FIG. 6 is an exploded perspective view of a disk device according to a first embodiment of the invention.
Figure 7:
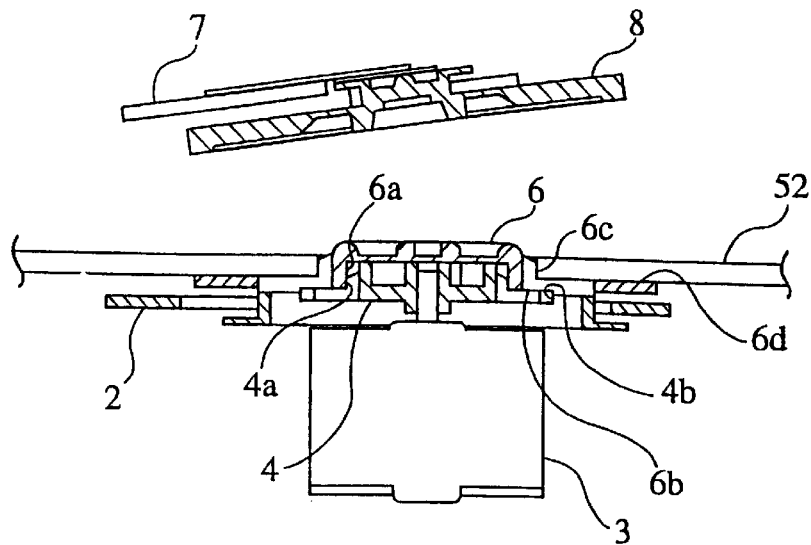
FIG. 7 is a cross sectional view of a turntable.
Figure 8:
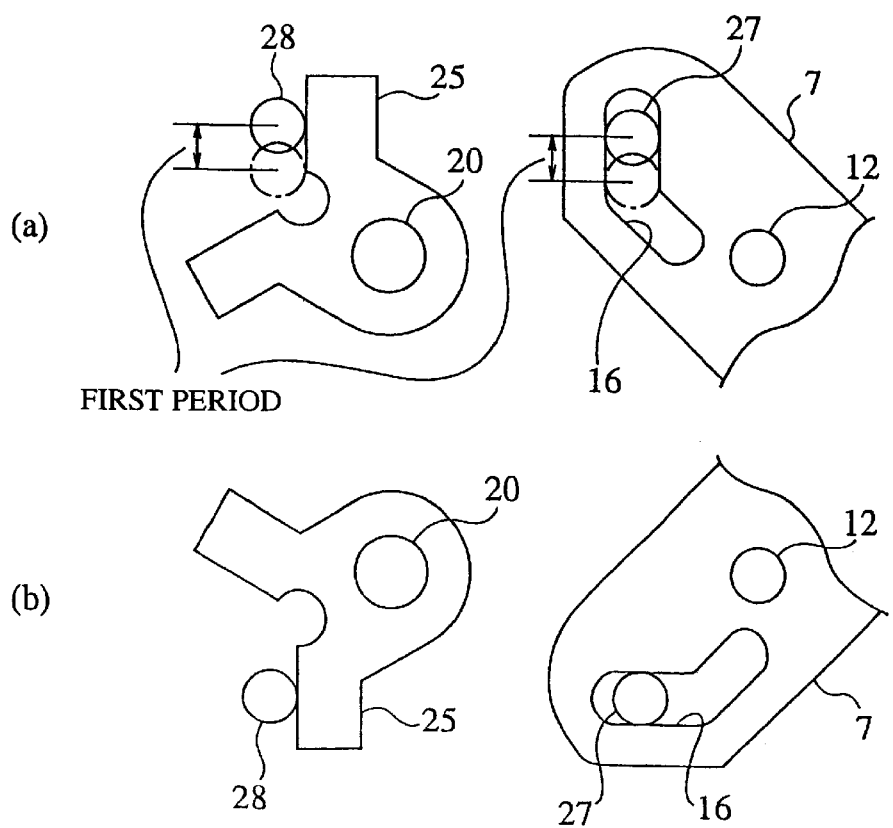
FIG. 8 is a detailed view of the cam section.

FIG. 6 is an exploded perspective view of a disk device according to a first embodiment of the present invention. FIG. 7 is a cross sectional view of a turntable. FIG. 8 is a detailed view of the cam section. In FIG. 6, reference numeral 1 denotes a base mounting a spindle motor 3 and optical pickup 5. 4 is a first turntable which is fixed to the spindle motor 3 and comprises a centering section which corresponds to a central hole of a first disk (minidisk) 51 and a backing face. 6 is a second turntable and comprises a centering section which corresponds to a central hole of a second disk (compact disk) 52 and a backing face. The second turntable 6 is retained with a play on a tip of a first retaining arm 2.

9a, 9b are guide rails which are supported in parallel by a support member 10 on the base 1. The optical pickup 5 is supported to displace on the guide rails 9a, 9b by supporting arms 5a–5c. 20 is a first support shaft which supports the first support arm 2 to rotate freely in a horizontal plane with respect to a second retaining arm 21. 11 is a second support shaft which supports the first retaining arm 2 and second retaining arm 21 to reciprocate freely together in a vertical plane with respect to the base 1. 25 is a cam which is attached to the first retaining arm 2 and is supported to rotate freely on the first support shaft 20.

8 is a clamp for pressing a second disk 52 and is retained with a play on the tip of the clamp arm 7. 12 is a support shaft which supports a rear end of the clamp arm 7 to rotate freely with respect to the folding horizontal face 13a of the arm 13. The clamp arm 7 and the arm 13 are supported by the support member 15 on the base 1 to reciprocate freely together in a vertical direction with respect to the base by the support shaft 11 and the support shaft 14. Furthermore a cam groove 16 is formed on the clamp arm 7.

17 is a first drive plate which is displaced in the direction of the arrow J–K in the figure by a drive source (not shown).

A pin 22 is provided in order to abut with the cam 19 formed on the arm 13. 23 is a second drive plate which is displaced in the direction of the arrow J–K in the figure in the same way. A pin 26 for abutting with the cam 24 formed on the second retaining arm 21, a pin 27 for engaging with the cam groove 16 formed on the clamp arm 7 and a pin 28 for engaging with the cam 25 are respectively provided.

FIG. 7 is a cross sectional view of a turntable. A cylindrical section 4a and backing face 4b for centering a first disk are formed on the first turntable 4. The second turntable comprises a cylindrical indentation 6a which engages with the cylindrical section 4a, an abutting face 6b which abuts with the backing face 4b, a cylindrical section 6c which centers a second disk 52 and a backing face 6d. In a first embodiment, an arm raising means is comprised by a pin 26 and cam 24 and an arm rotation means is comprised by the pin 28 and cam 25, and the pin 27 and cam groove 16. An arm depressing means is comprised by the pin 22 and the cam 19.

The operation of the invention will be described below.

Figure 9:
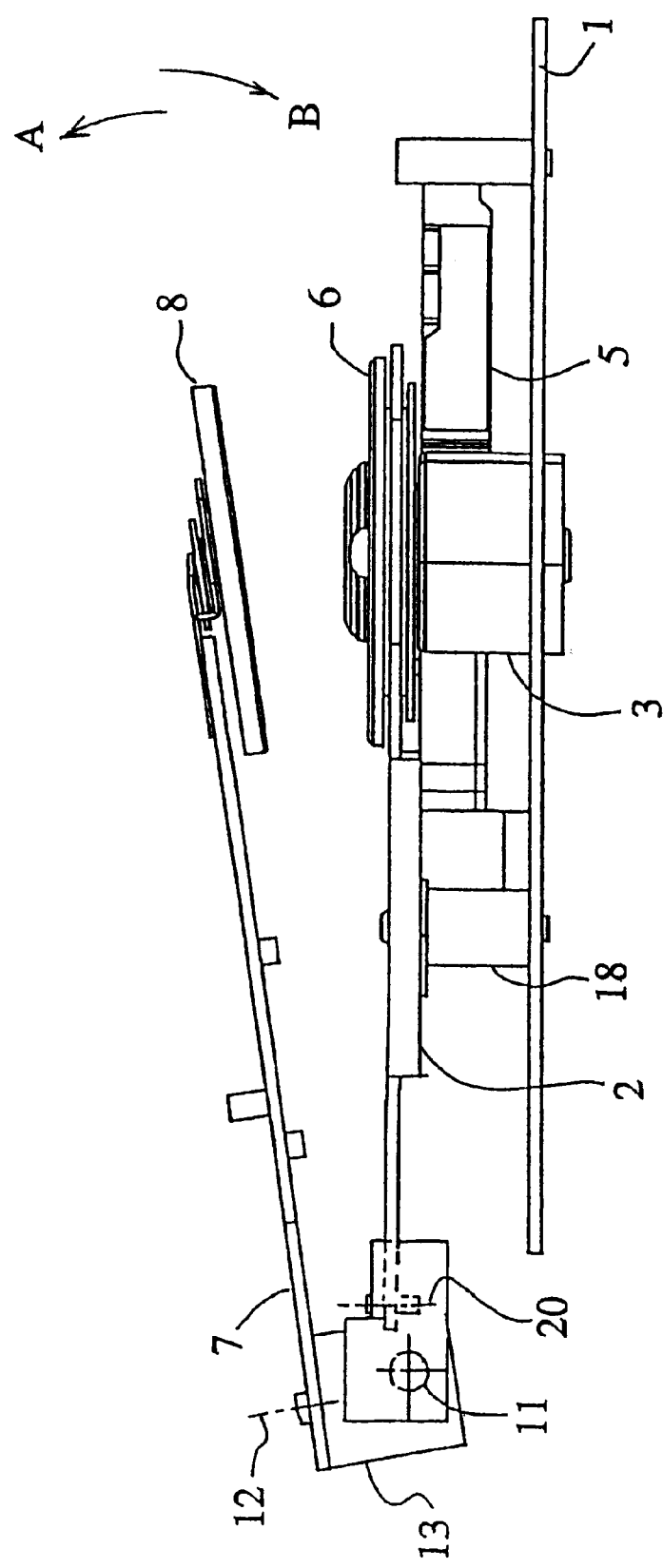
FIG. 9 is a lateral view of a CD loading prepared state.

FIG. 9 is a lateral view of a receiving state in which a disk has not been loaded. The second turntable 6 is loaded onto the first turntable 4. The abutting section 29 provided on the first retaining arm 2 and the position determination pin 18 formed on the base 1 abut to fix the position.

Figure 10:
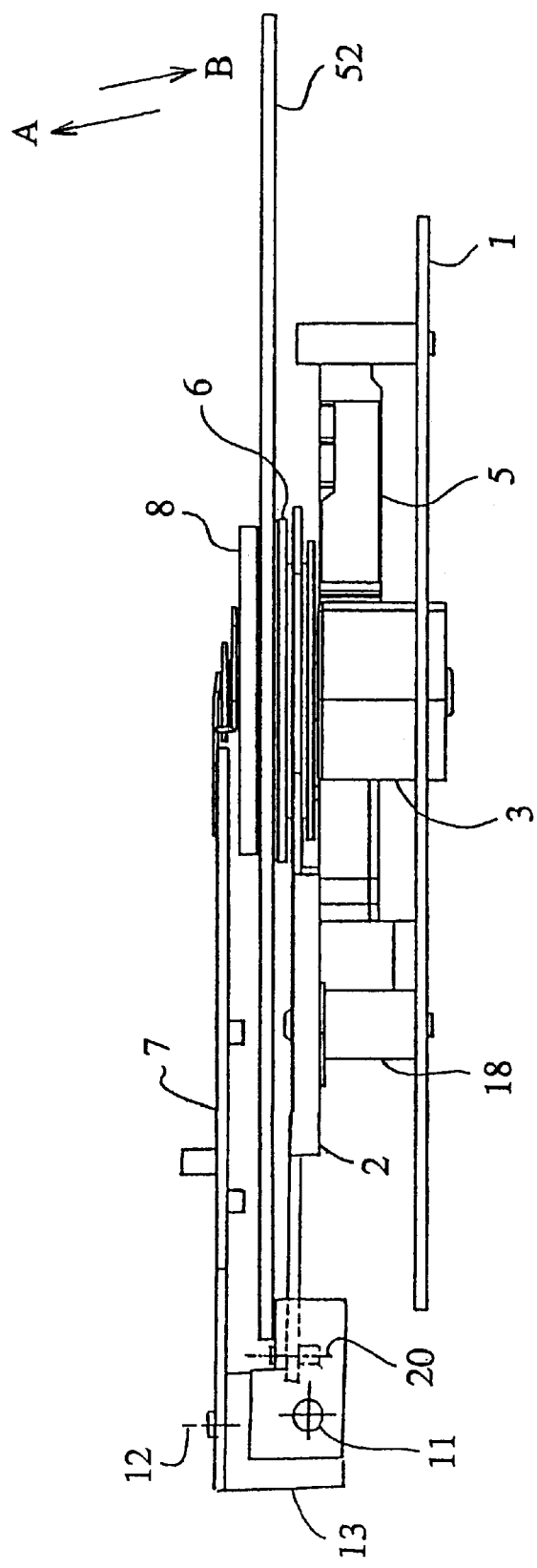
FIG. 10 is a lateral view of a CD as loaded.

In this state, when a second disk (hereafter compact disk) 52 is guided by a loading mechanism (not shown) in the gap between the clamp 8 and the second turntable 6 and reaches a fixed position, the first drive plate 17 shown in FIG. 6 is pressed in the direction J directly by the guided compact disk 52 or by another member. After reaching a position at which the drive force of the loading mechanism is applied, the displacement continues in the same direction with the application of that force. As a result, the pin 22 separates from the cam 19, the clamp arm 7 and the arm 13 reciprocate the second support shaft 11 and the support shaft 14 in an axial direction at the same time in the direction of the arrow B. The clamp 8 presses the compact disk 52 onto the second turntable 6 and reaches the state as shown in FIG. 10. Thereafter the spindle motor 3 rotates, the rotational force is transmitted to the compact disk 52 and a playing operation is initiated.

Figure 11:
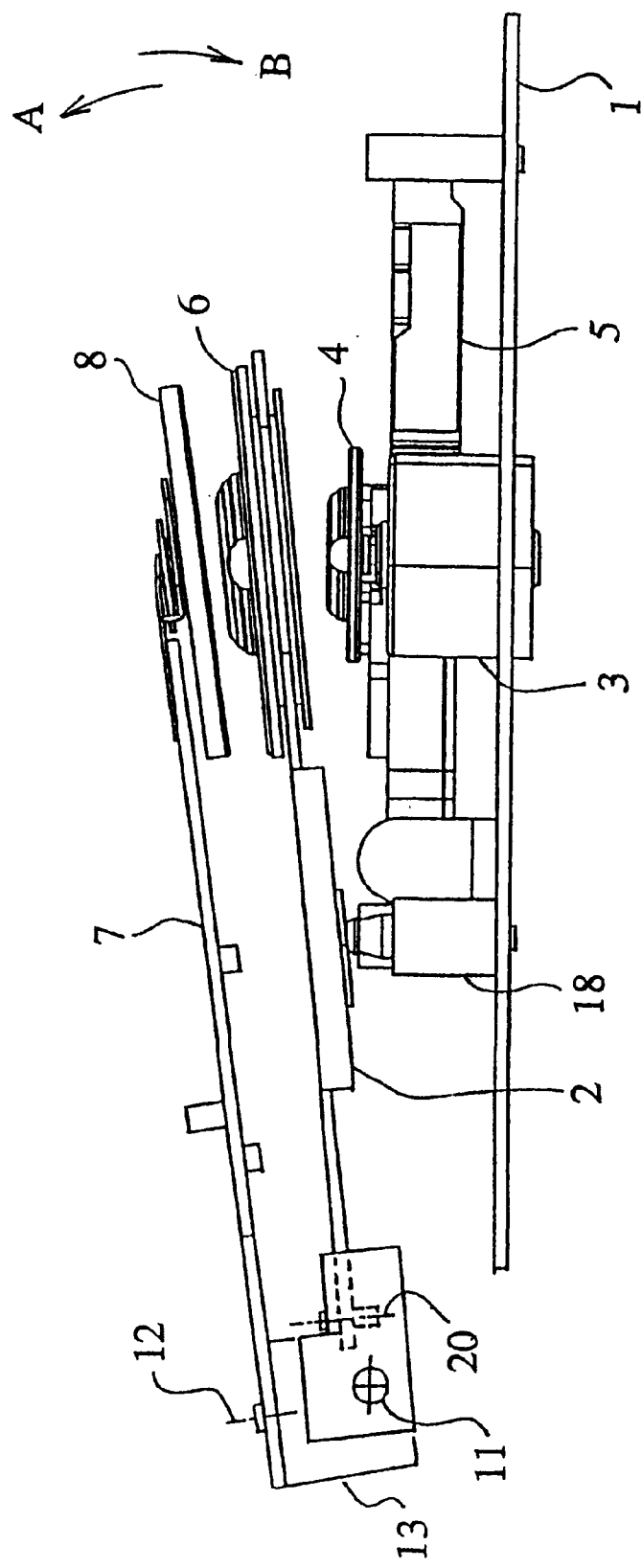
FIG. 11 is a lateral view of a second turntable separated from a first turntable.

Now the playing operation of a first disk (hereafter minidisk) will be described. From the state as shown in FIG. 9, when a minidisk 51 stored in a cartridge 53 is inserted by the loading mechanism (not shown), the second drive plate 23 shown in FIG. 6 is pressed in the direction J directly by the cartridge 53 or by another member. After reaching a position at which the drive force of the loading mechanism is applied, the displacement continues in the same direction with the application of that force. In a first period after the initiation of displacement of the second drive plate 23, the second retaining arm 21 and the first retaining arm 2 reciprocate in the direction A of the arrow due to the relationship of the pin 26 operating on the cam 24. The second turntable 6 separates from the first turntable 4 and the device reaches the state as shown in FIG. 11.

That is to say, as shown in FIG. 8, in a first period after the initiation of displacement of the second drive plate 23, the pins 28, 27 respectively slide the parallel section of the cam groove 16 and the cam 25. Thus the first retaining arm 2 and the clamp arm 7 maintain a stationary state, the second turntable 6 rises from the first turntable 4 and separates from the first turntable 4 without rotating. Therefore both engagement sections can separate smoothly.

When the second drive plate 23 displaces in the direction J of the arrow and enters a second period, the clamp arm 7 and the first retaining arm 2 displace in the direction D of the arrow due to the engagement of the pin 27 and the cam groove 16, and the pin 28 and the cam 25. That is to say, they rotate to a fixed refuge position which does not interfere with the cartridge 53. Thereafter the cartridge 53 is lowered onto the first turntable by the loading mechanism (not shown). A minidisk 51 stored in the cartridge 53 is loaded onto the first turntable 4, rotated by the spindle motor 3, and a playing operation is performed. Since an ejection operation of the cartridge 53 is merely the reverse operation to that described above, further description will be omitted.

Embodiment 2

In embodiment 1 above, the arrangement of rotating and refuging the second turntable 6 to a fixed position which does not interfere horizontally with the cartridge 53 was described. In this second embodiment, after the second turntable 6 rotates to a fixed refuge position which does not interfere with the first turntable 4, the first retaining arm 2 and the second retaining arm 21 reciprocate downwardly pivoting on the second support shaft 11 and refuge to a position below the cartridge 53.

Figure 12:
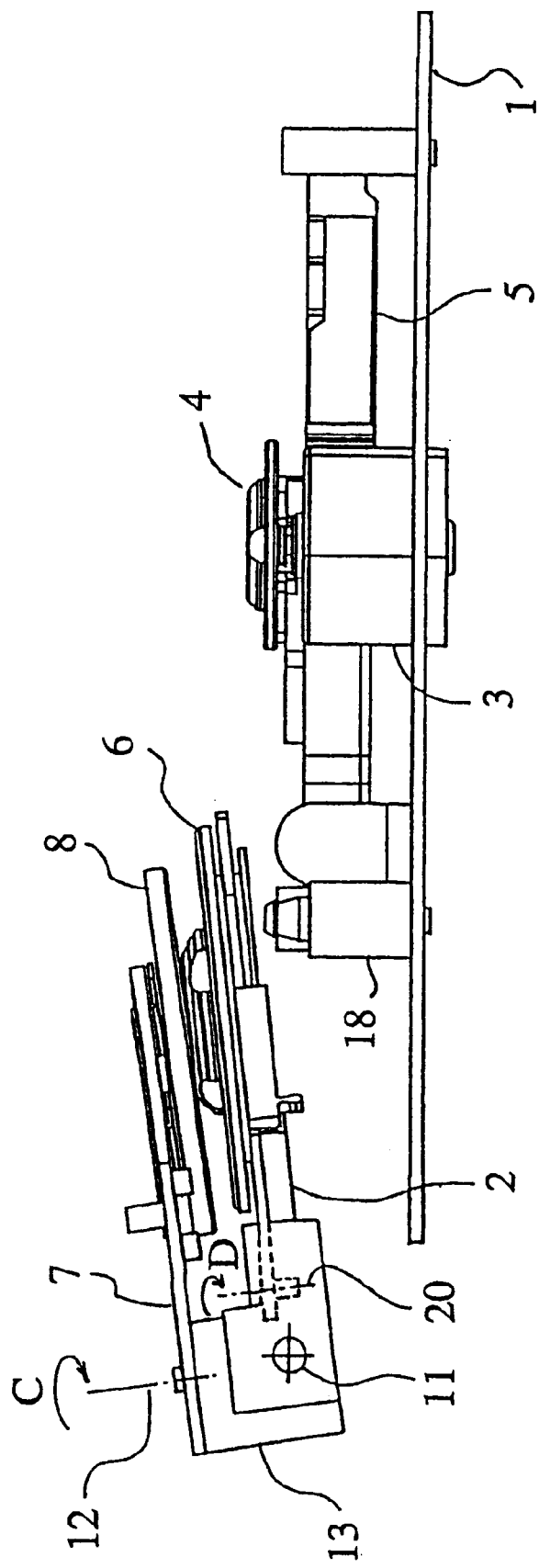
FIG. 12 is a lateral view of a second turntable displaced to a refuge position which does not interfere with a first turntable, in a disk device according to a second embodiment of the present invention.
Figure 13:
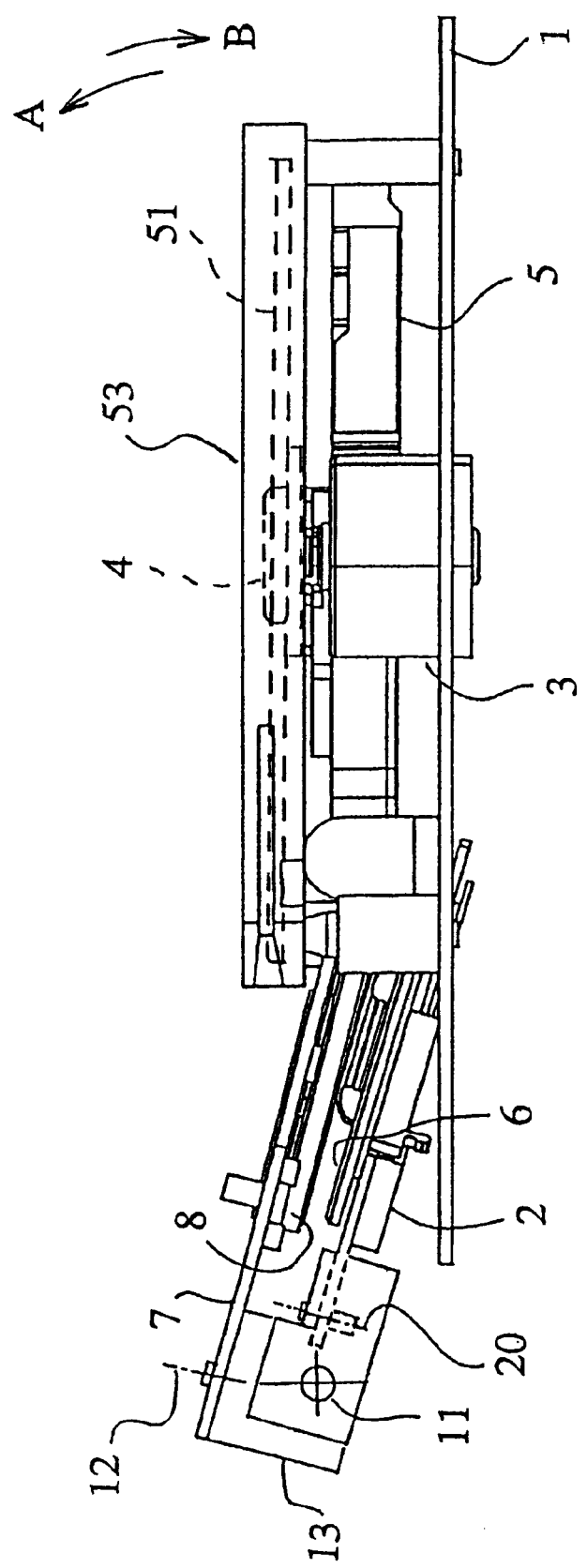
FIG. 13 is a lateral view of a section of a second turntable refuged lower than a playing position for a cartridge.
Figure 15:
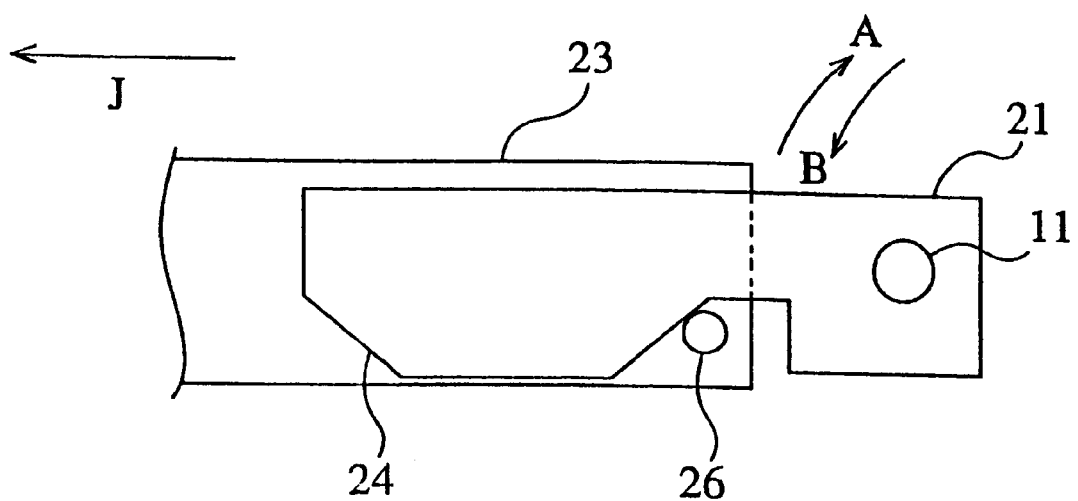
FIG. 15 describes the main components of the above disk device.

The playing operation of the compact disk 52 is the same as that described with reference to embodiment 1 and further description will be omitted. In the same way, the operation up to separating the second turntable 6 from the first turntable 4 is the same as that described with reference to embodiment 1 and further description will be omitted. When the second drive plate 23 displaces in the direction of the arrow and reaches a second period, the clamp arm 7 displaces in the direction C of the arrow and the first retaining arm 2 displaces in the direction D of the arrow due to the engagement of the pin 27 and the cam groove 16, and the pin 28 and the cam 25. That is to say, they respectively rotate to a fixed refuge position which does not interfere with the cartridge 53 and reach the state as shown in FIG. 12. Thereafter the first drive plate 17 is pressed in the direction J of the arrow directly in the displacement process of the second drive plate 23 shown in FIG. 6 or by another member. As shown in FIG. 15, the second retaining arm 21 displaces in the direction of the arrow B in response to the incline of the cam 24 and the arm 13 displaces in the direction of the arrow B in the same way in response to the incline of the cam 19 and both components respectively reciprocate. At least a section of the second turntable 6 stops on reaching a refuge position which is below the playing position of the cartridge 53 as shown in FIG. 13.

In this state, a guided cartridge 53 is lowered by the loading mechanism (not shown), the compact disk 51 is loaded onto the first turntable 4, rotated by the spindle motor 3 and a playing operation is initiated. Since an ejection operation of the cartridge 53 is merely the reverse operation to that described above, further description will be omitted.

Embodiment 3

Figure 14:
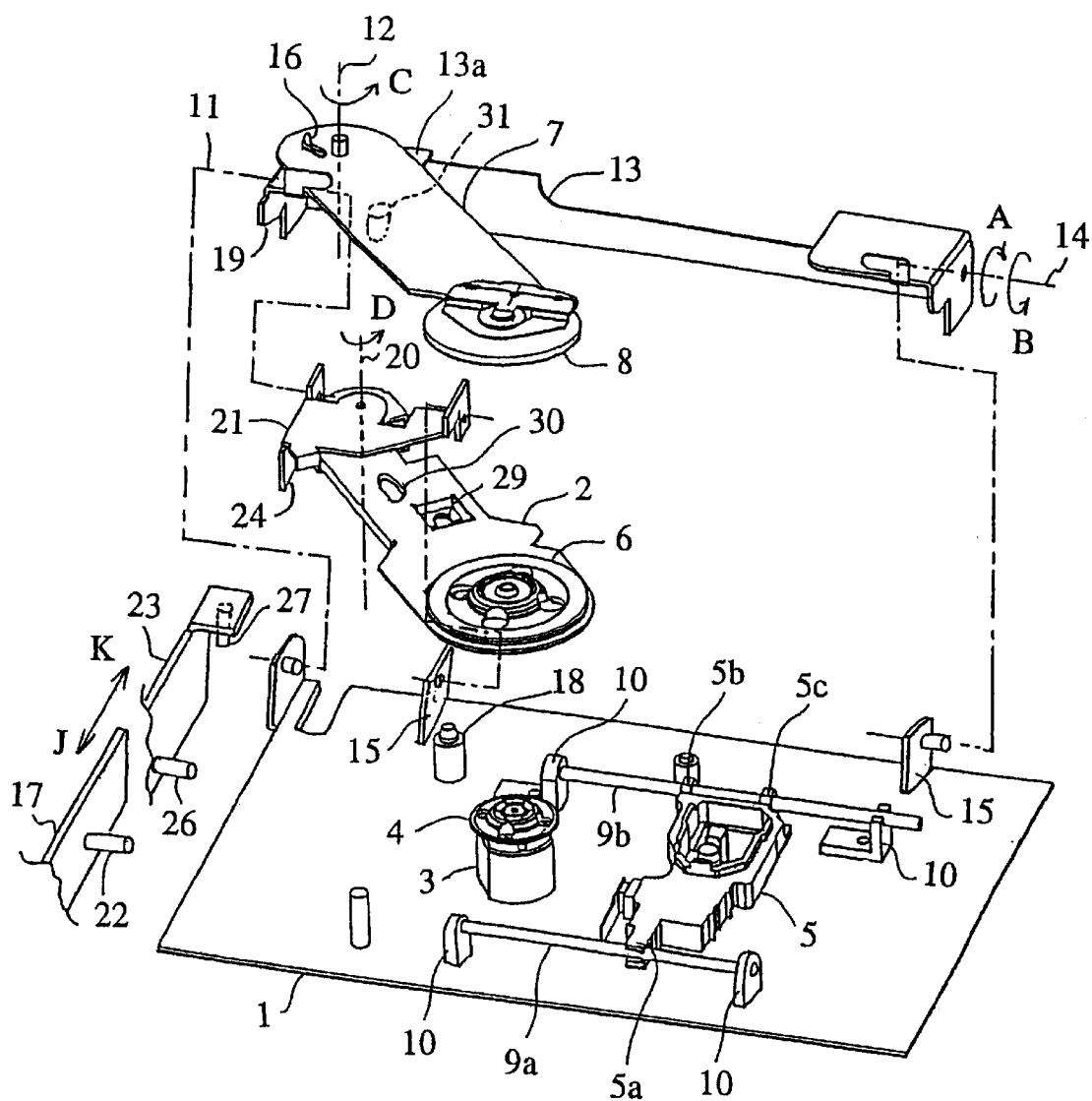
FIG. 14 is an exploded perspective view showing a disk device according to a third embodiment of the present invention.

In embodiments 1 and 2 above, the rotating of the first retaining arm 2 was performed by the engagement of the pin 28 and the cam 25. In this third embodiment as shown in FIG. 14, the arrangement forming engagement sections 30, 31 which can combine with the clamp arm 7 when the first retaining arm 2 is raised and which correspond to the first retaining arm 2 and the clamp arm 7 will be described. The playing operation of the compact disk 52 is the same as that described with reference to embodiment 1 and further description will be omitted.

The operation of the invention will be described below.

As described with reference to embodiment 1, when a minidisk 51 stored in a cartridge 53 is inserted by the loading mechanism (not shown), the second drive plate 23 is pressed in the direction J of the arrow directly by the guided cartridge 53 or by another member. After reaching a position at which the drive force of the loading mechanism can be applied, displacement is continued in the same direction with the application of that force.

In a first period after the initiation of displacement of the second drive plate 23, the first retaining arm 2 rises and the engagement hole 30 which is formed on the first retaining arm 2 engages with the engagement section 31 acting as an engagement section formed on the clamp arm 7 due to the operation of the pin 26 on the cam 24. When the second drive plate 23 displaces further and reaches a second period, the clamp arm 7 rotates in the direction C of the arrow due to the engagement of the pin 27 and the cam groove 16.

At this time, the first retaining arm 2 rotates in direction D of the arrow together with the clamp arm 7 and reaches and stops at a fixed refuge position which does not interfere with the cartridge 53. Thereafter a cartridge 53 is lowered by the loading mechanism (not shown), the minidisk 51 is loaded onto the first turntable 4, rotated by the spindle motor 3 and a playing operation is initiated. Since an ejection operation of the cartridge 53 is merely the reverse operation to that described above, further description will be omitted.

Embodiment 4

A fourth embodiment of the disk device of the present invention will be described below.

In embodiment 4, when a minidisk is inserted, the CD clamp and CD adapter which participate in the loading and ejection of compact disks displace into the device in order not to interfere with the loading of a minidisk and refuge downwardly to a position below the minidisk loaded onto the turntable.

Figure 16:
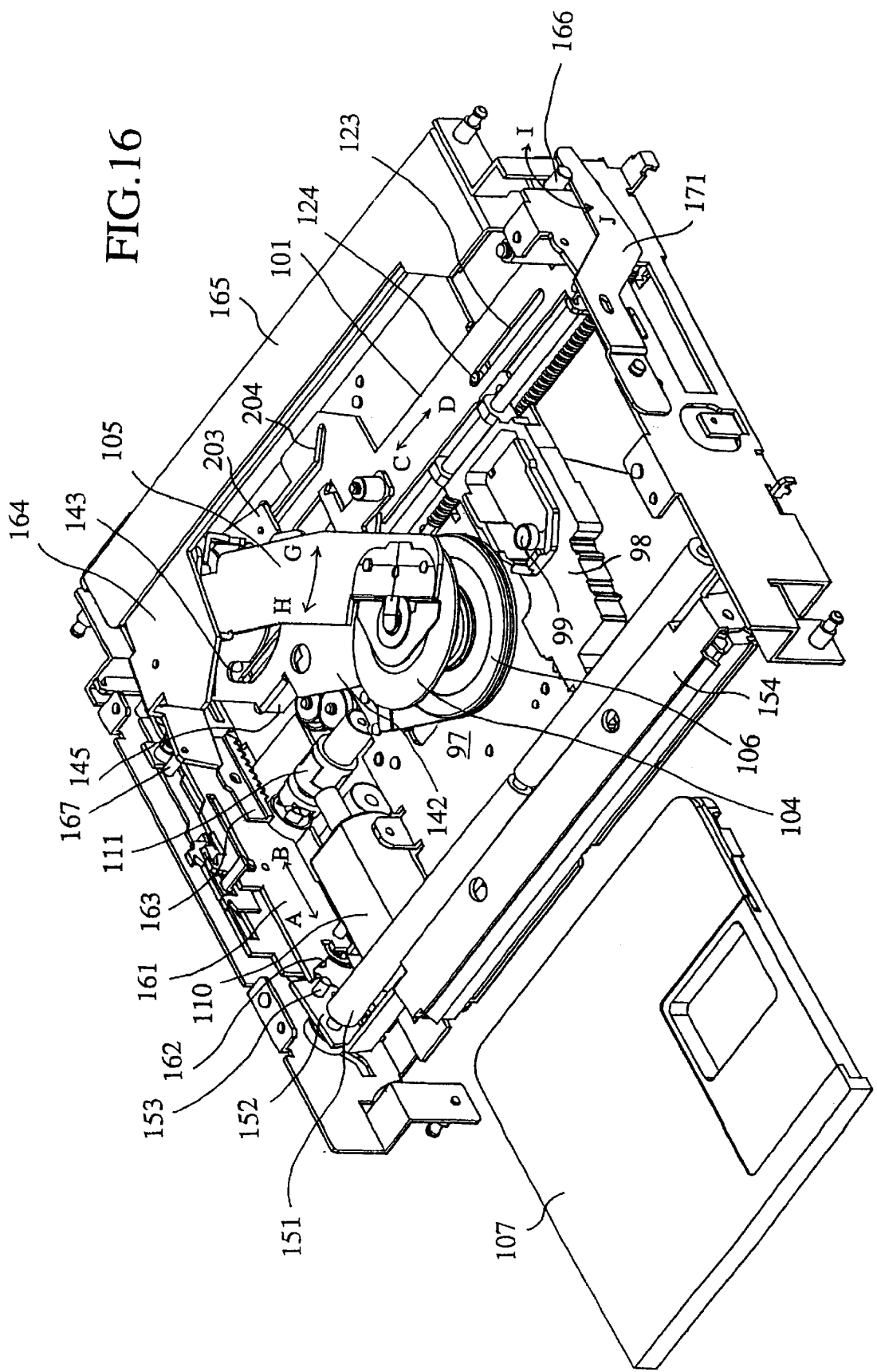
FIG. 16 is a three-dimensional view showing a ready position before disk insertion in a disk device according to a fourth embodiment of the present invention.
Figure 17:
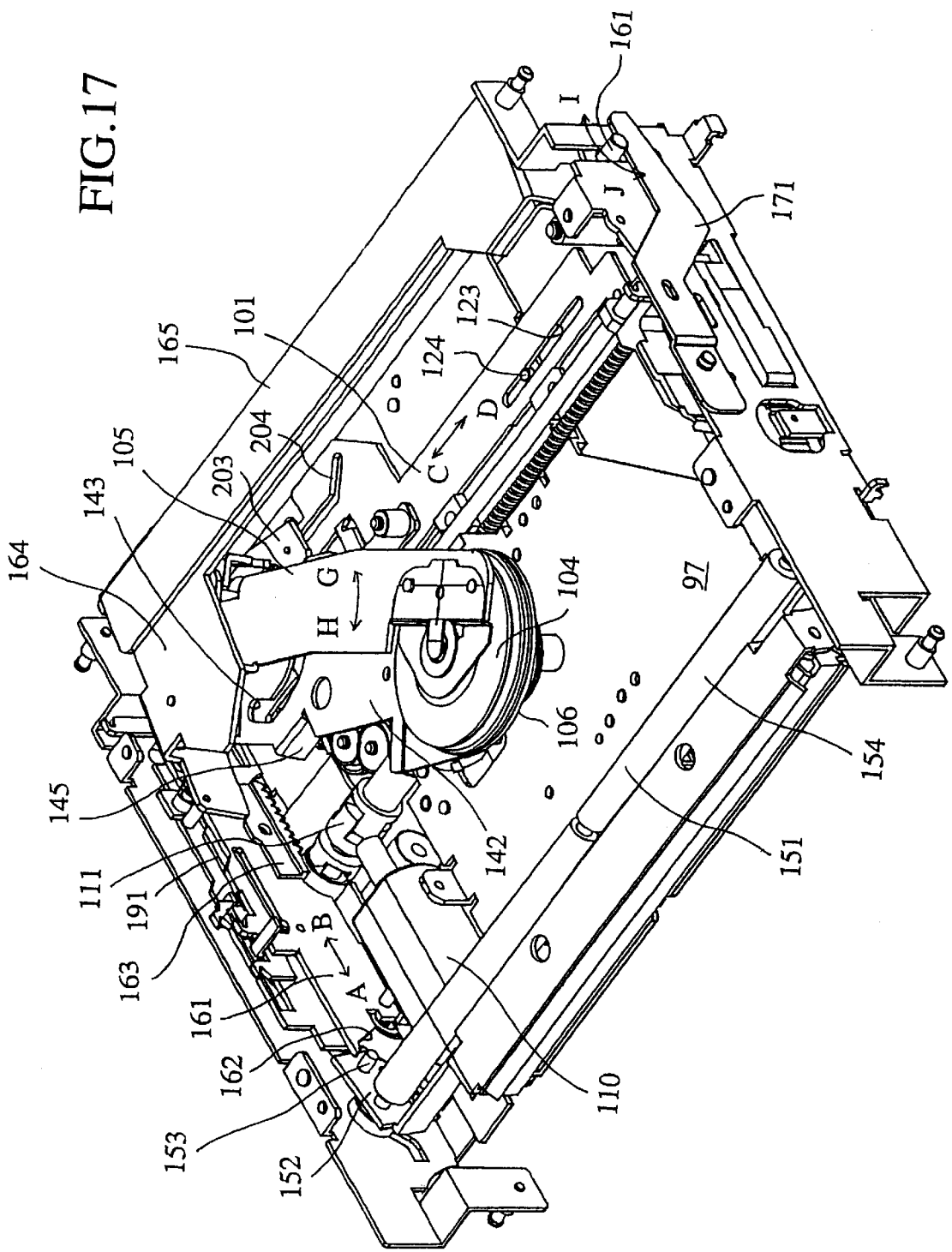
FIG. 17 is a three-dimensional view showing a ready position before disk insertion in a disk device according to a fourth embodiment of the present invention.

FIG. 16 and FIG. 17 are three-dimensional figures showing a ready position before disk insertion in a disk device according to a fourth embodiment of the present invention.

Figure 18:
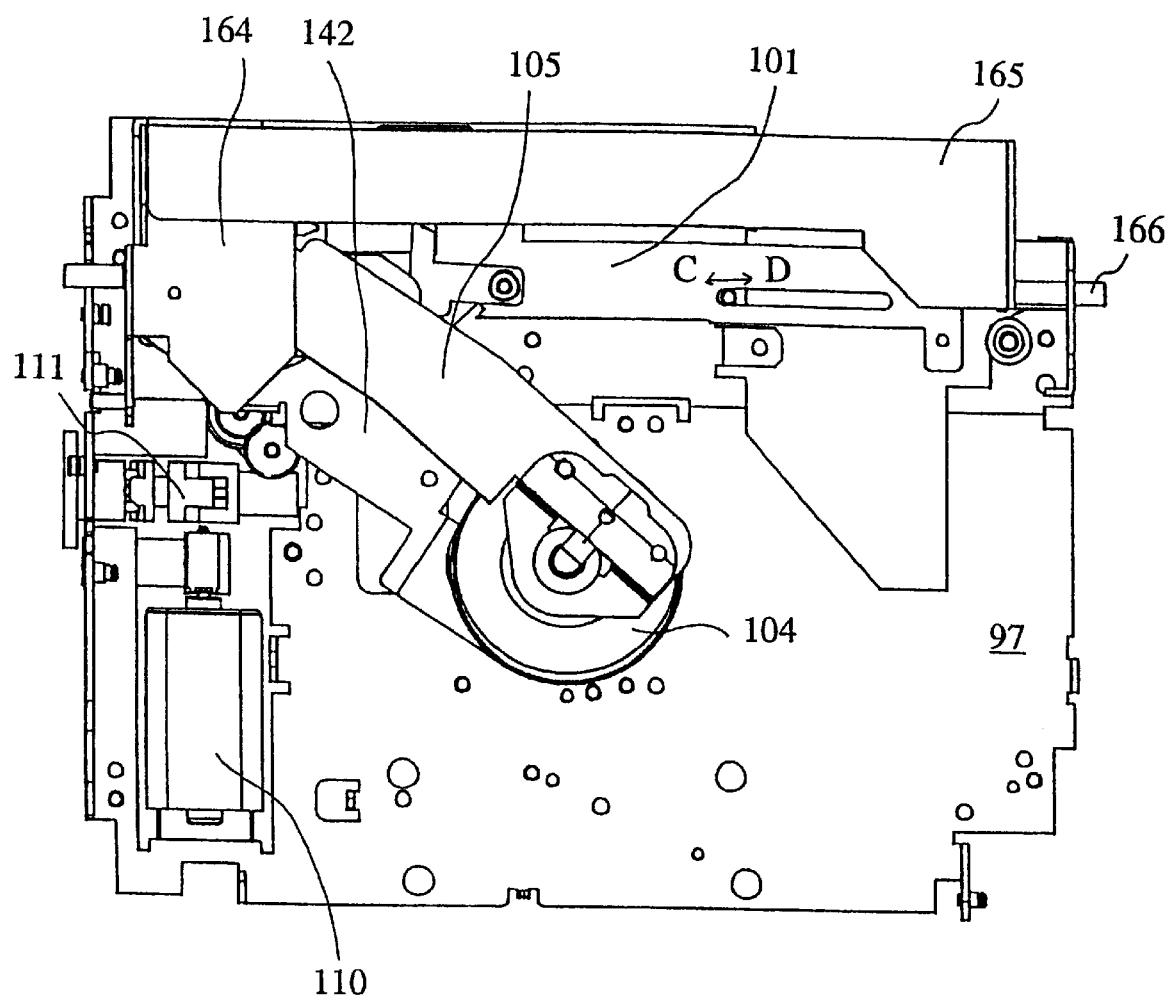
FIG. 18 is a schematic plan view of a transfer mechanism such as a roller or the like which transfers a compact disk into the device in a disk device according to a fourth embodiment of the present invention.
Figure 19:
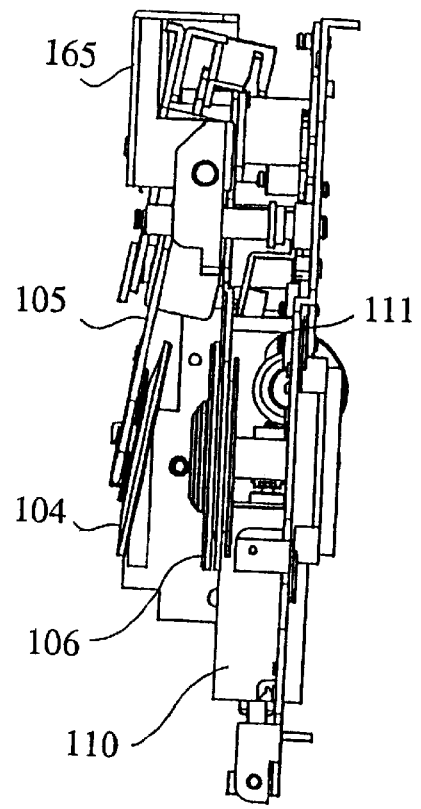
FIG. 19 is a right-side view of the disk device shown in FIG. 18.
Figure 20:
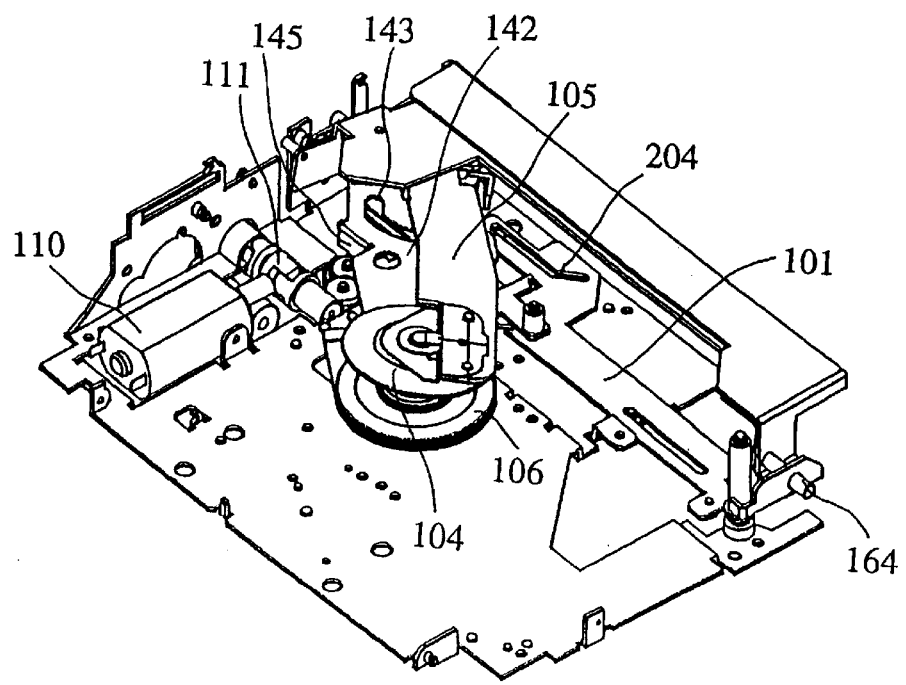
FIG. 20 is a three-dimensional view of the state of the device as shown in FIG. 18.

FIG. 18 is a schematic plan view of a transfer mechanism such as a roller or the like which transfers a compact disk into the device in a disk device in the ready position before disk insertion as shown in FIG. 16. FIG. 19 is a right-side view of the disk device shown in FIG. 18. FIG. 20 is a three-dimensional figure of the state as shown in FIG. 18.

Figure 21:
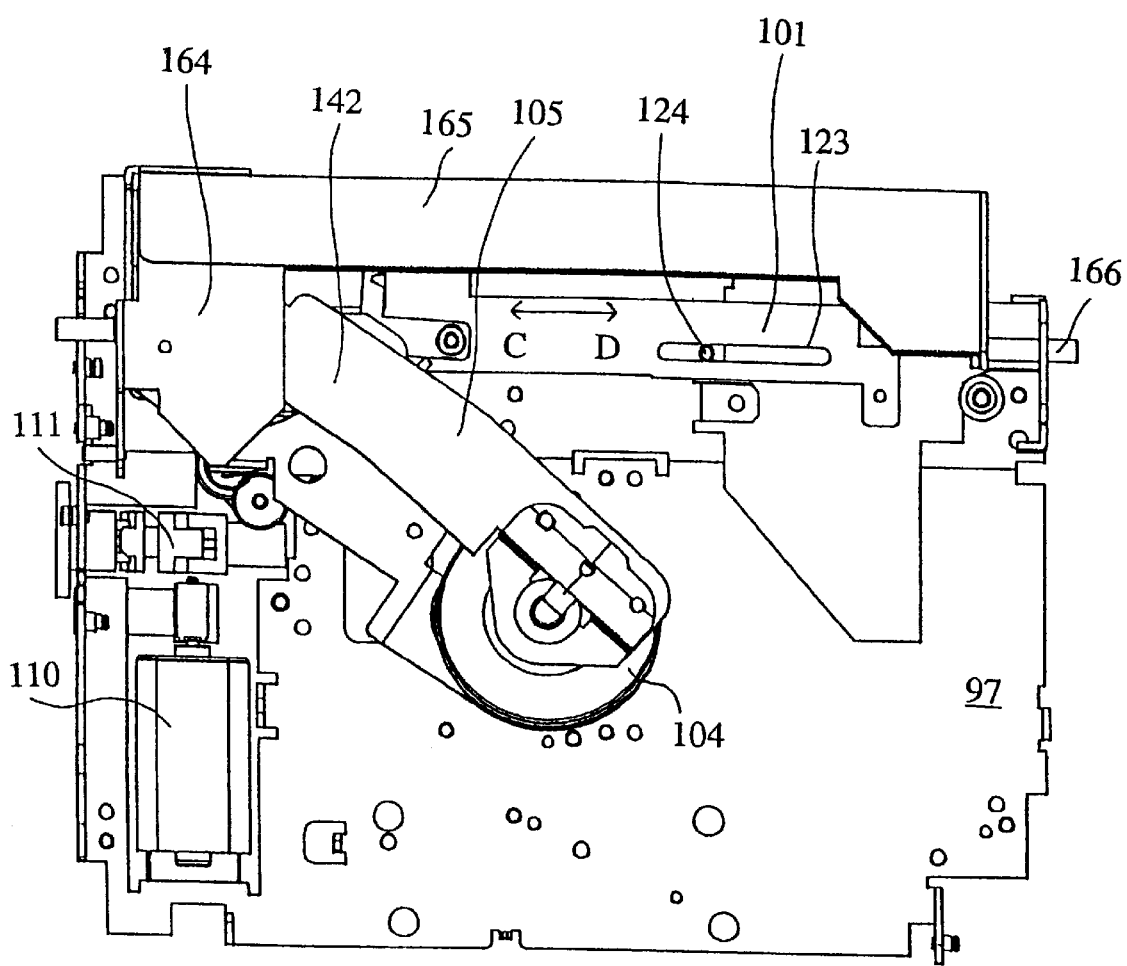
FIG. 21 is a schematic plan view of a transfer mechanism such as a roller or the like which transfers a compact disk into the device raised by the CD adapter upwardly and layered onto the rear face of the CD clamp.
Figure 22:
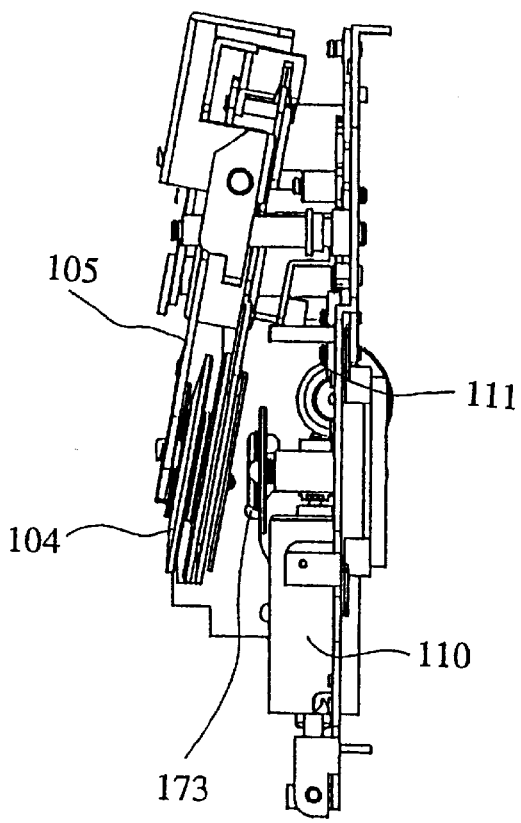
FIG. 22 is a right-side view of the disk device shown in FIG. 21.
Figure 23:
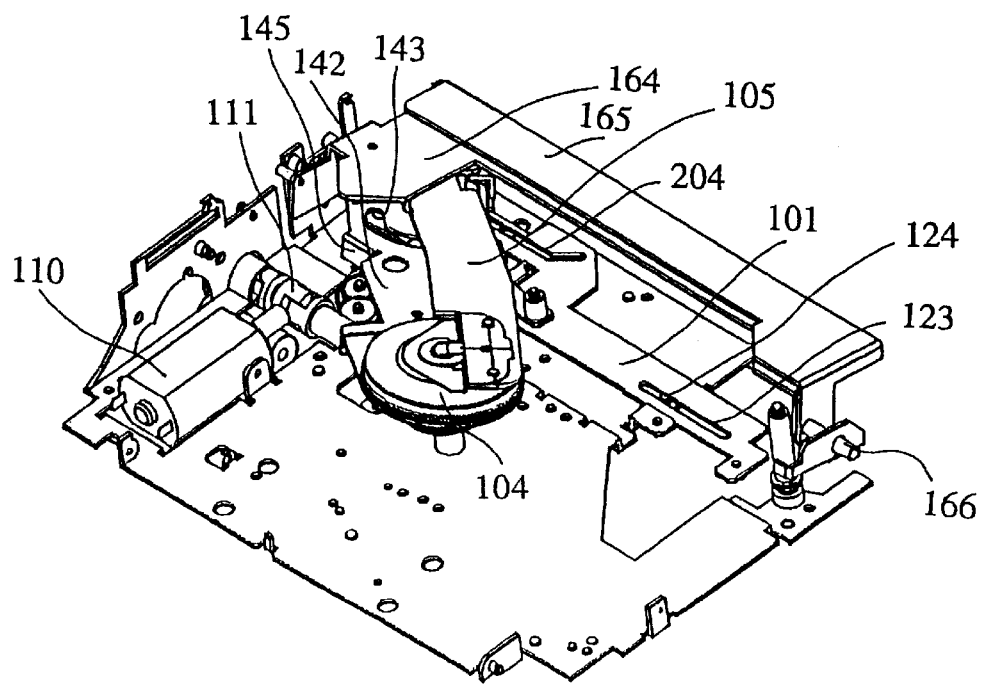
FIG. 23 is a three-dimensional view of the state of the device shown in FIG. 21.

FIG. 21 is a schematic plan view of a transfer mechanism such as a roller or the like which transfers a compact disk into the device raised by the CD adapter upwardly and layered onto the rear face of the CD clamp in a disk device in the ready position before disk insertion as shown in FIG. 16. FIG. 22 is a right-side view of the disk device shown in FIG. 21. FIG. 23 is a three-dimensional view of the state of the device shown in FIG. 21.

Figure 24:
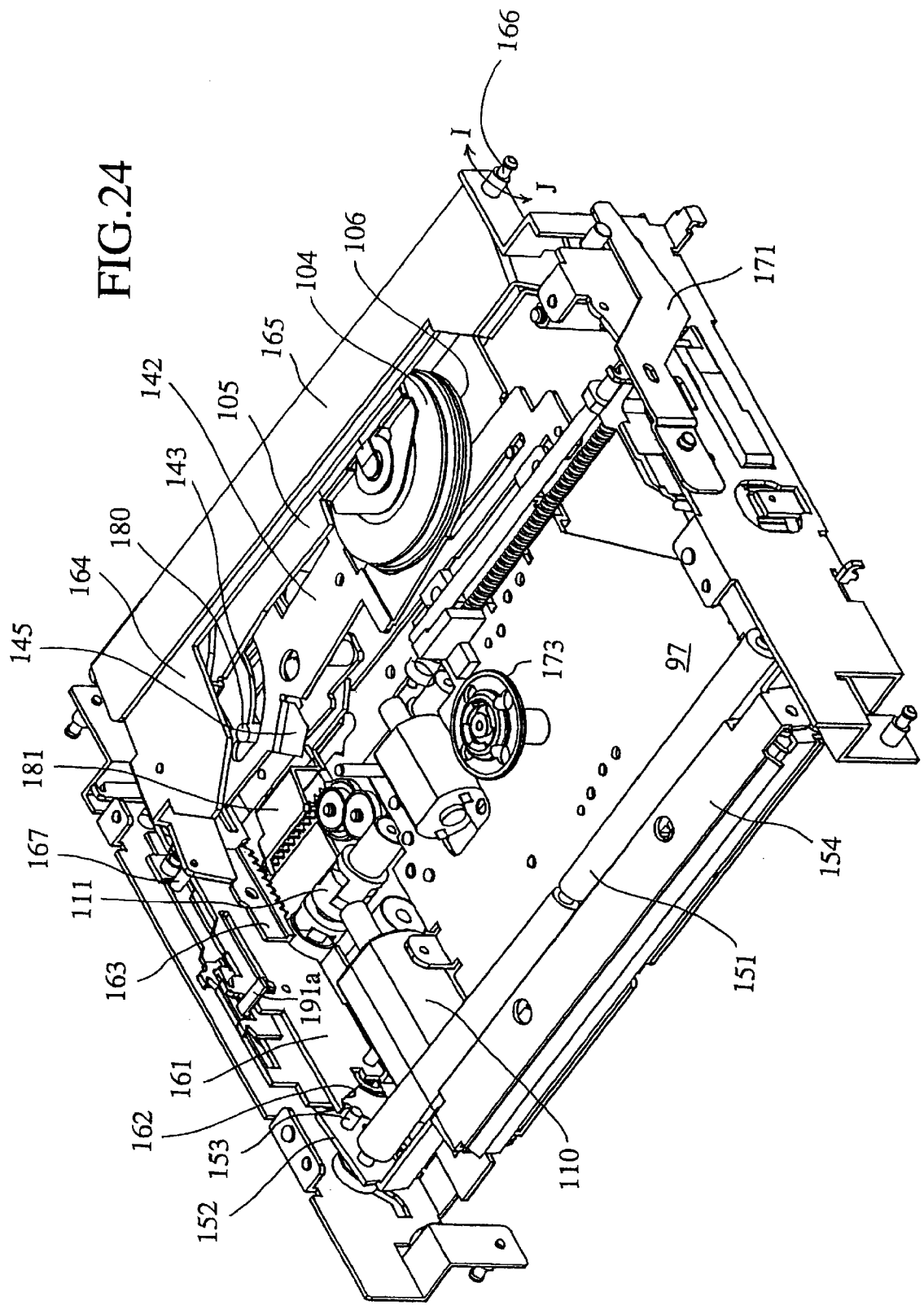
FIG. 24 is a three-dimensional view of the CD clamp and the CD adapter as displaced into the device in a disk device according to a fourth embodiment of the present invention.
Figure 25:
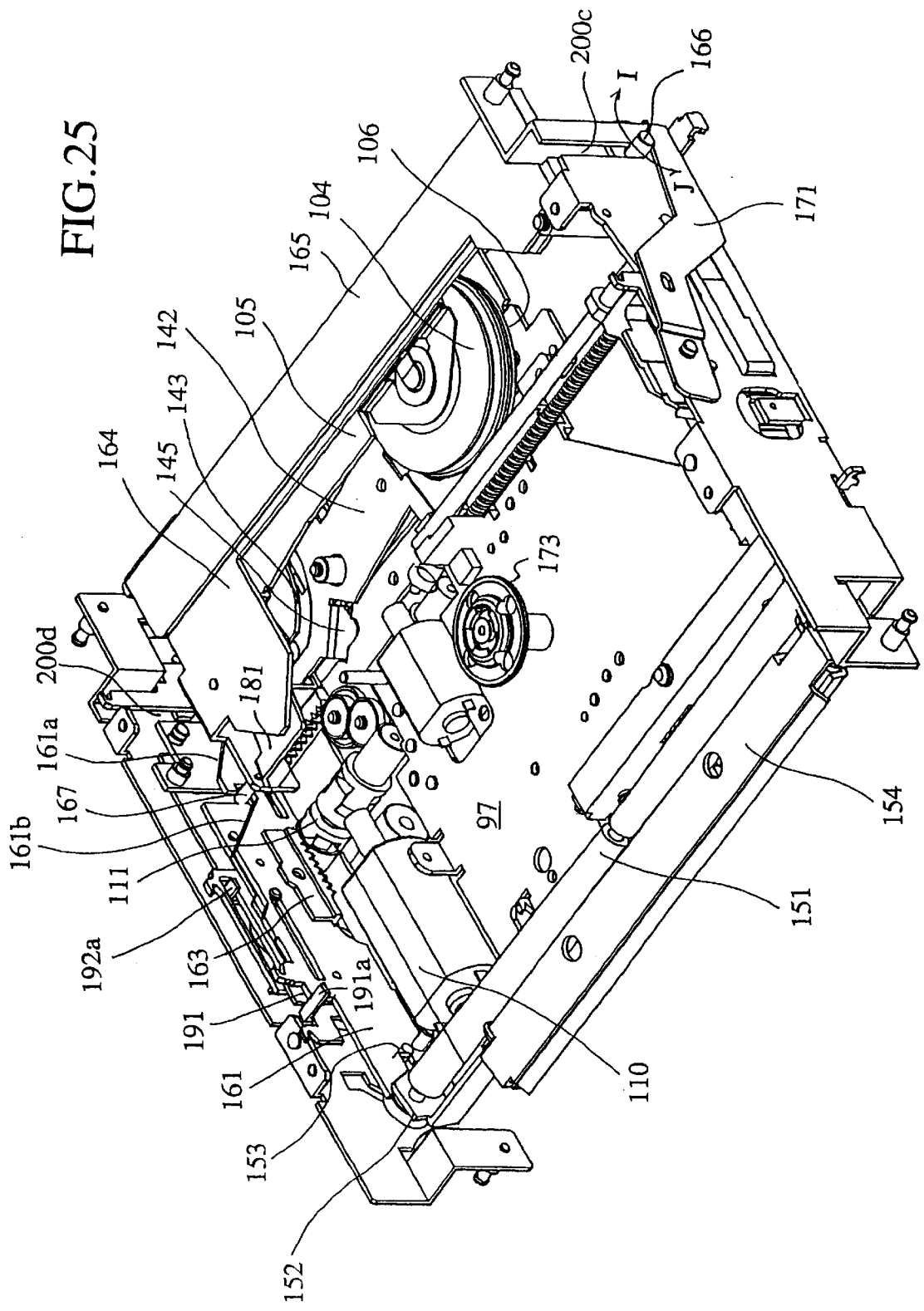
FIG. 25 is a three-dimensional view of the CD clamp and the CD adapter as refuged into the device in a disk device according to a fourth embodiment of the present invention.
Figure 26:
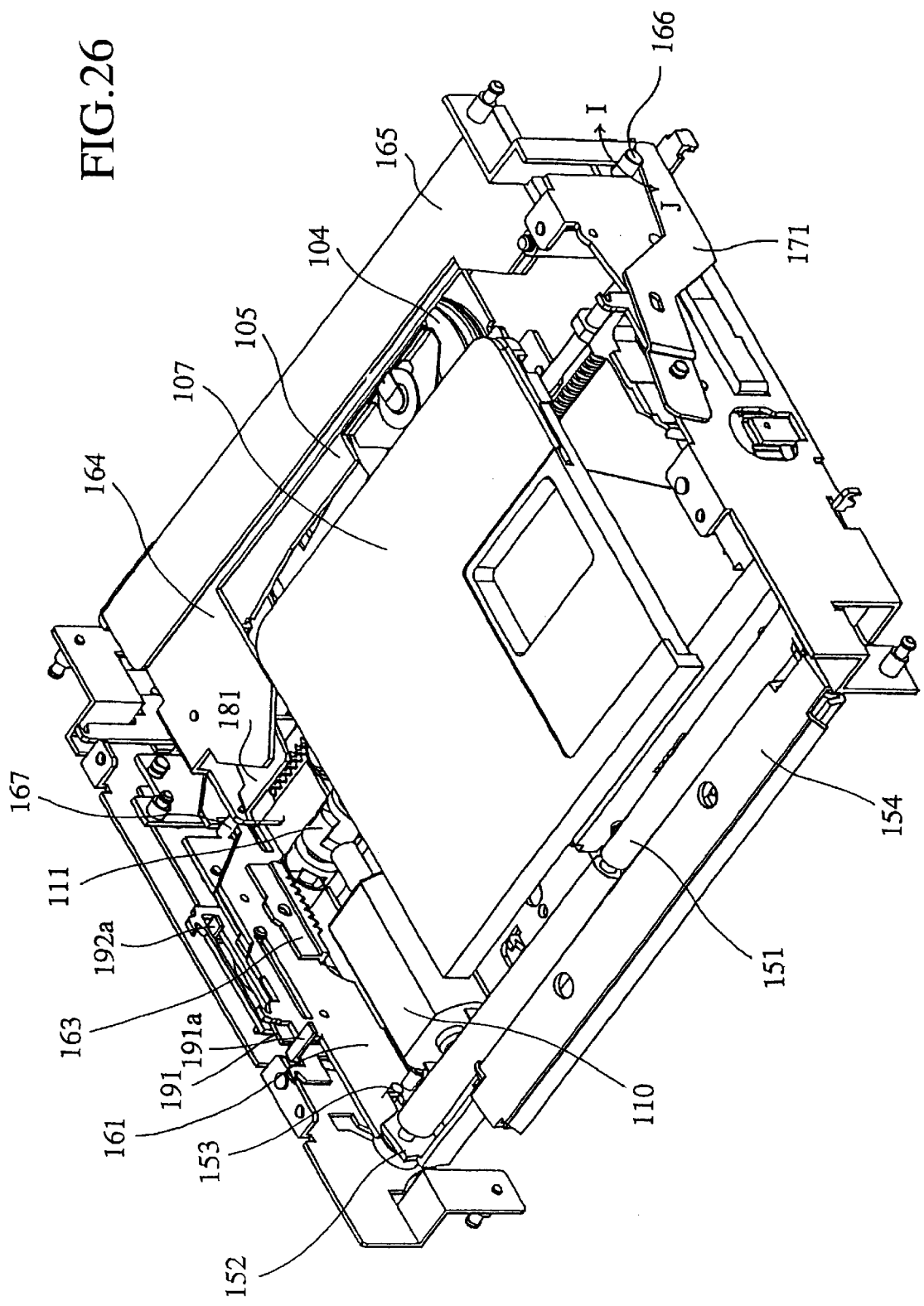
FIG. 26 shows the relationship between the state of the device as shown in FIG. 25 and a minidisk.

FIG. 24 is a three-dimensional view of the CD clamp and the CD adapter as displaced into the device. FIG. 25 is a three-dimensional view of the CD clamp and the CD adapter as displaced into the device and refuged into the device to a position lower than a minidisk loaded onto the turntable. FIG. 26 shows the relationship between the state of the device as shown in FIG. 25 and a minidisk.

Figure 27:
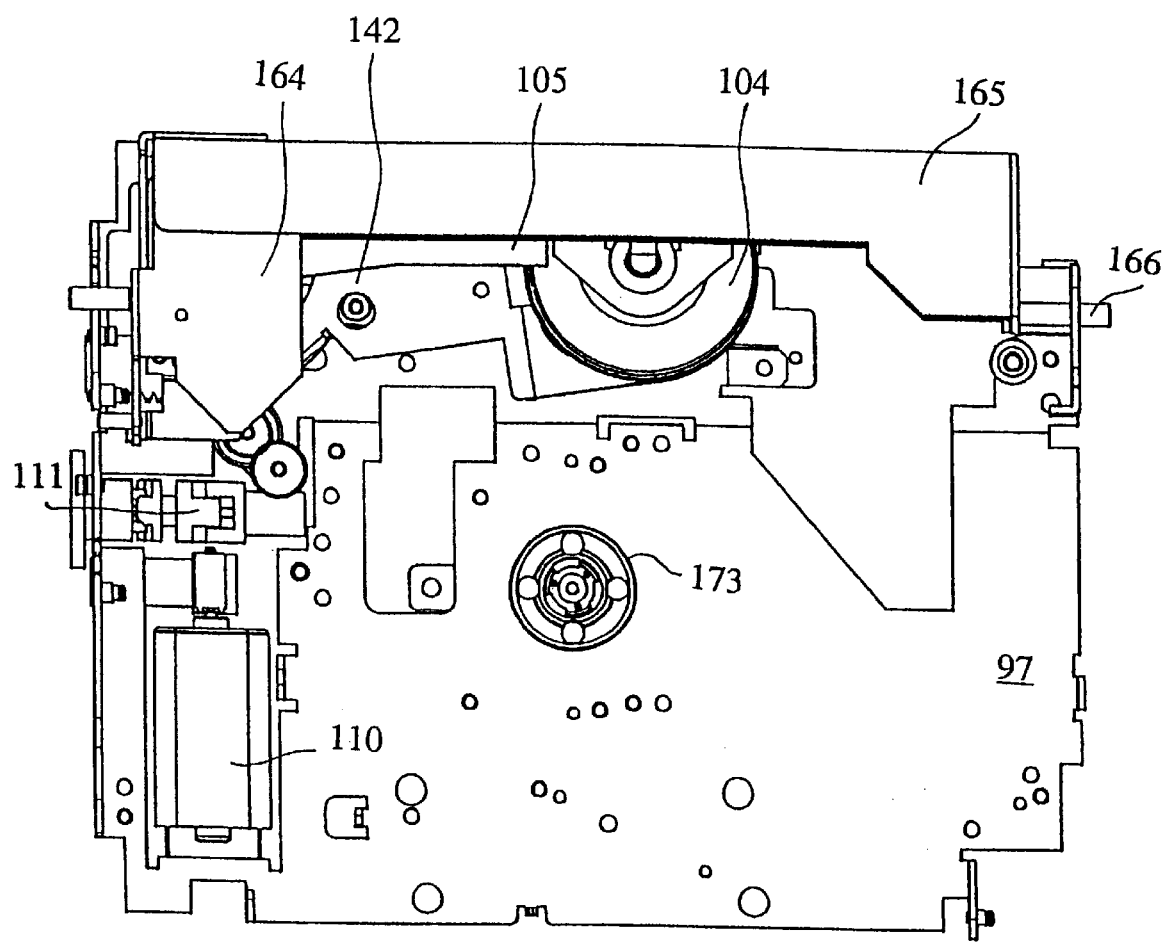
FIG. 27 is a plan view of the CD clamp and the CD adapter as displaced into the device in a disk device according to a fourth embodiment of the present invention.
Figure 28:
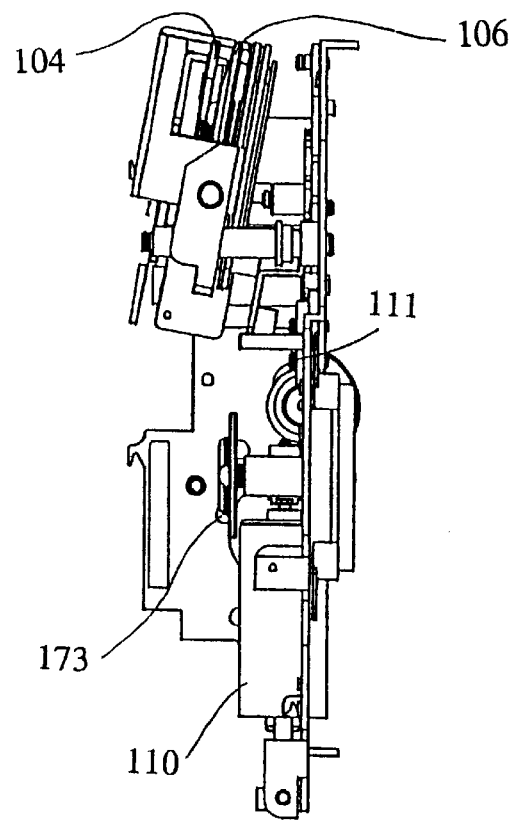
FIG. 28 is a right-side view of the disk device shown in FIG. 27.
Figure 29:
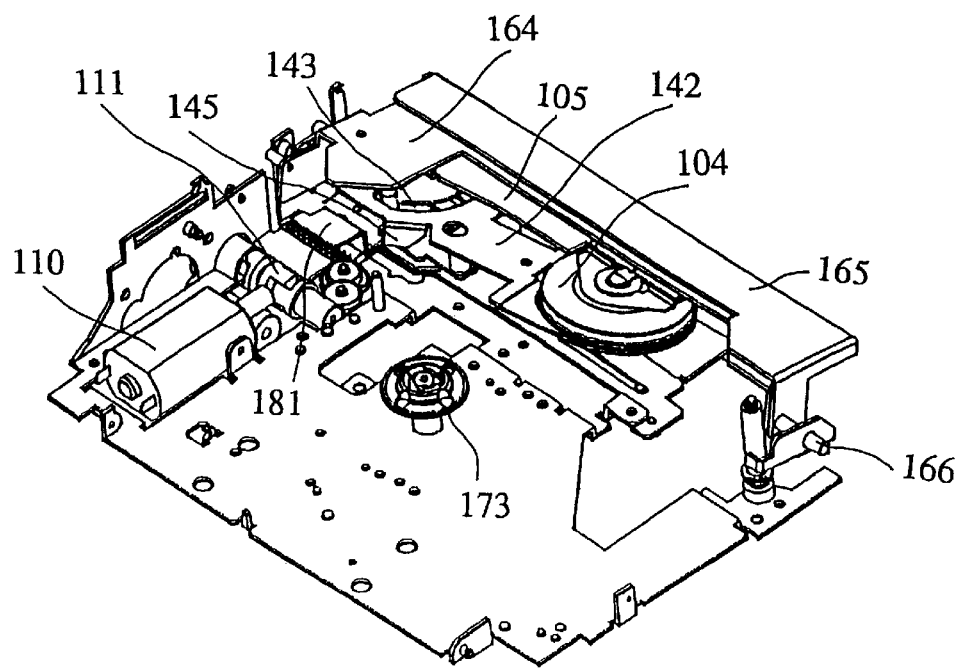
FIG. 29 is a three-dimensional view of the state of the device as shown in FIG. 27.

FIG. 27 is a schematic plan view of a transfer mechanism such as a roller for transferring the compact disk into the device in a disk device in which the CD clamp and the CD adapter in FIG. 24 are in a state of being displaced into the device. FIG. 28 is a right-side view of the disk device shown in FIG. 27. FIG. 29 is a three-dimensional view of the state of the device as shown in FIG. 27.

Figure 30:
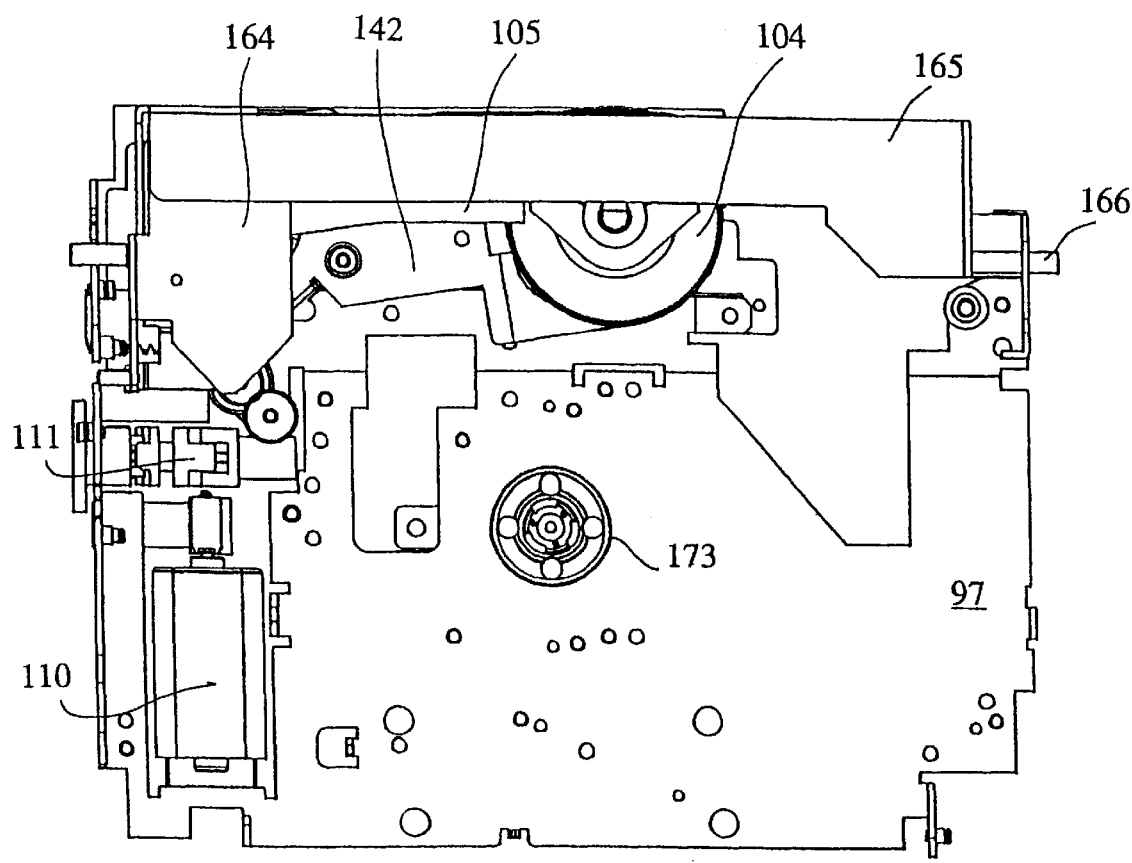
FIG. 30 is a plan view of the CD clamp and the CD adapter as refuged into the device in a disk device according to a fourth embodiment of the present invention.
Figure 31:
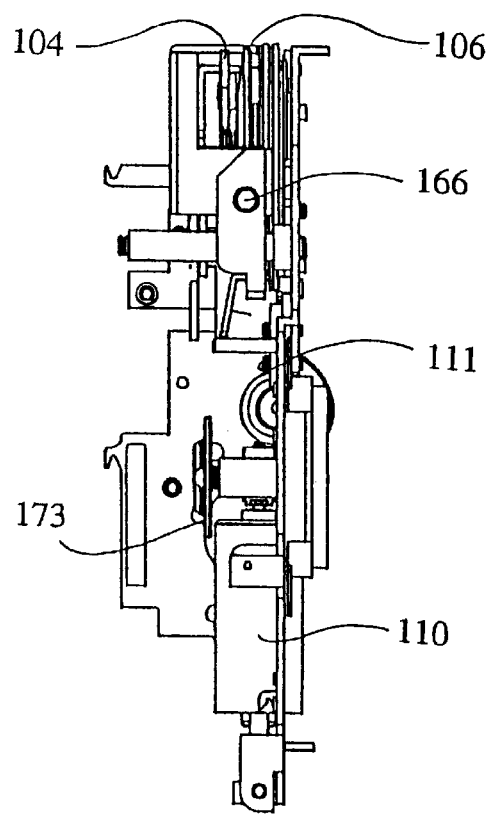
FIG. 31 is a right-side views of the disk device shown in FIG. 30.
Figure 32:
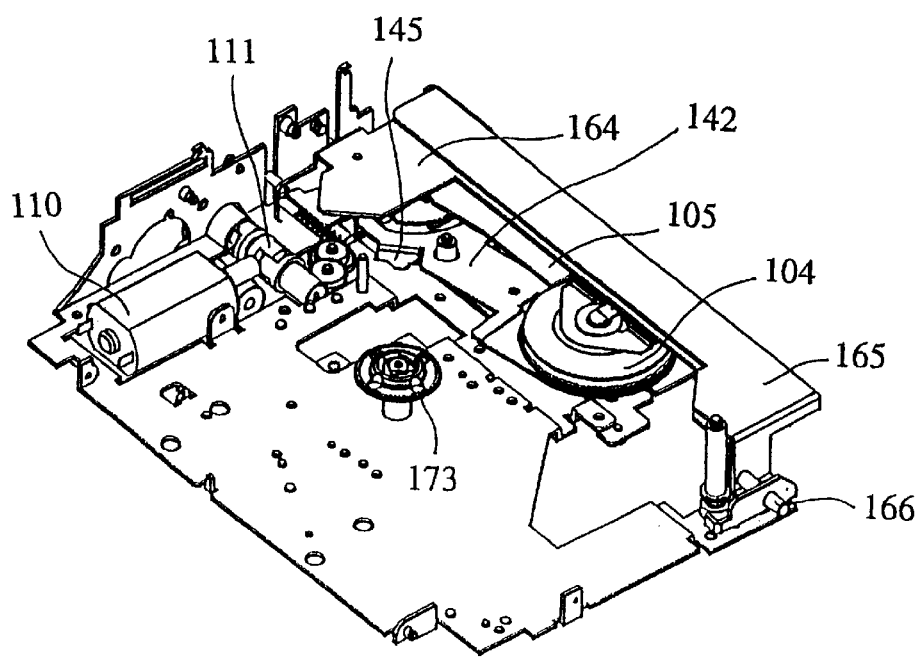
FIG. 32 is a three-dimensional view of the state of the device as shown in FIG. 30.

FIG. 30 is a schematic plan view of a transfer mechanism such as a roller for transferring the compact disk into the device in a disk device in which the CD clamp and the CD adapter in FIG. 25 are in a state of being displaced into the device. FIG. 31 is a right-side view of the disk device shown in FIG. 30. FIG. 32 is a three-dimensional view of the state of the device as shown in FIG. 30.

Figure 33:
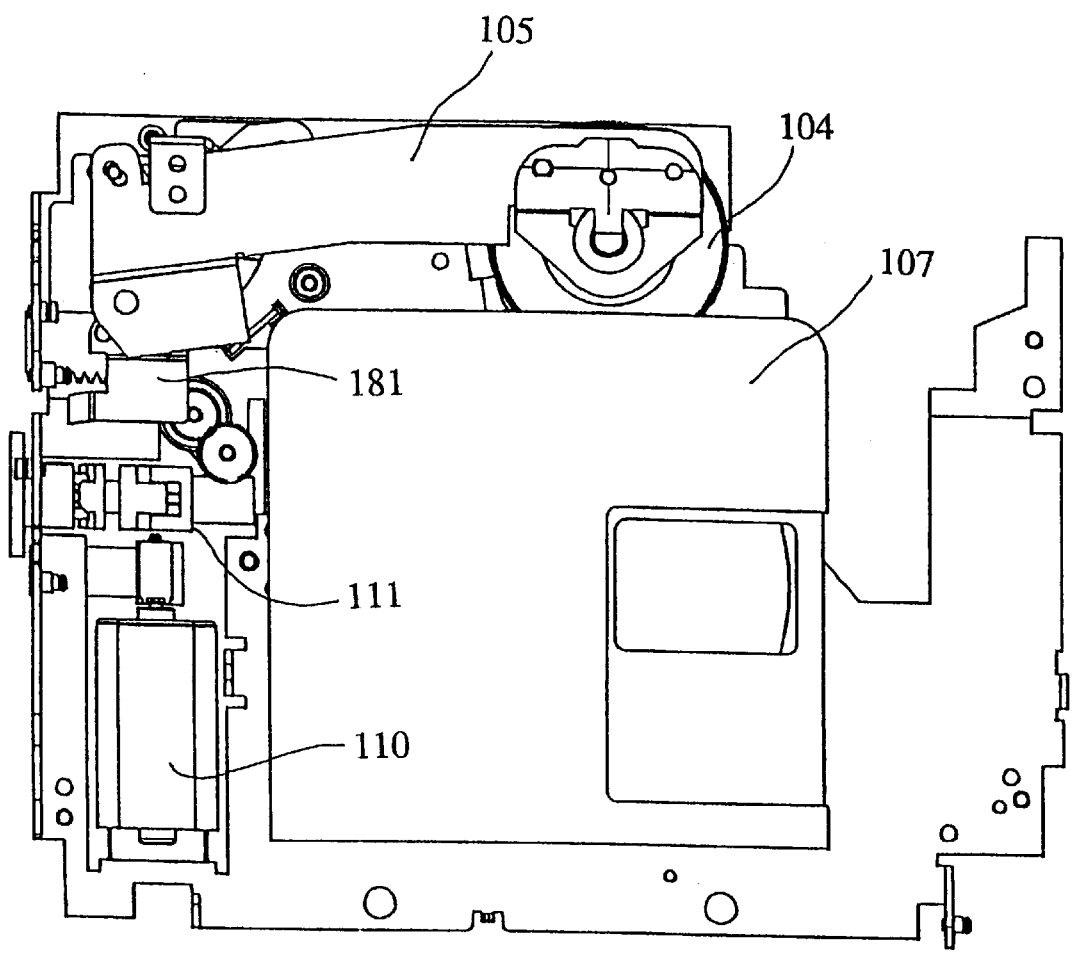
FIG. 33 is a plan view of the relationship between the refuged state of the CD clamp and the CD adapter into the device and a minidisk in a disk device according to a fourth embodiment of the present invention.
Figure 34:
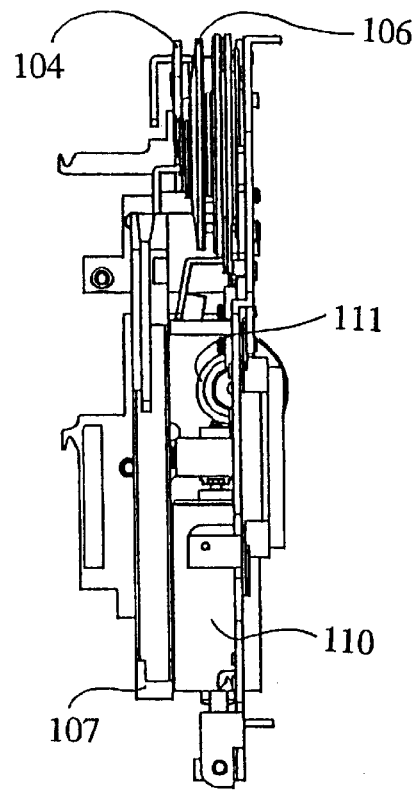
FIG. 34 is a right-side view of the disk device shown in FIG. 33.
Figure 35:
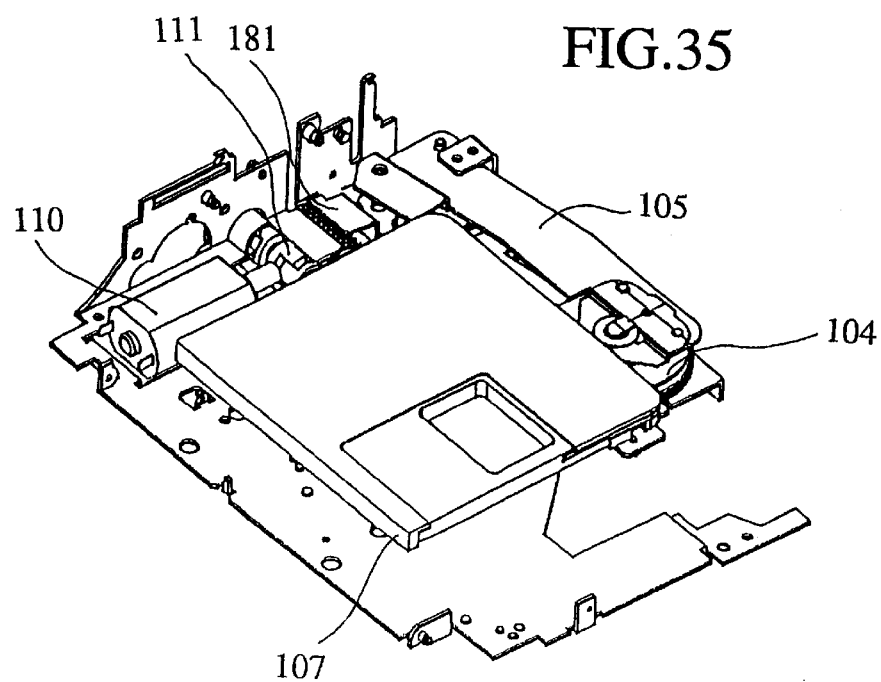
FIG. 35 is a three-dimensional view of the state of the device as shown in FIG. 33.

FIG. 33 is a schematic plan view of a transfer mechanism such as a roller for transferring the compact disk into the device in a disk device in which the CD clamp and the CD adapter in FIG. 25 are in a state of being displaced into the device. FIG. 34 is a right-side view of the disk device shown in FIG. 33. FIG. 35 is a three-dimensional view of the state of the device as shown in FIG. 33.

Figure 36:
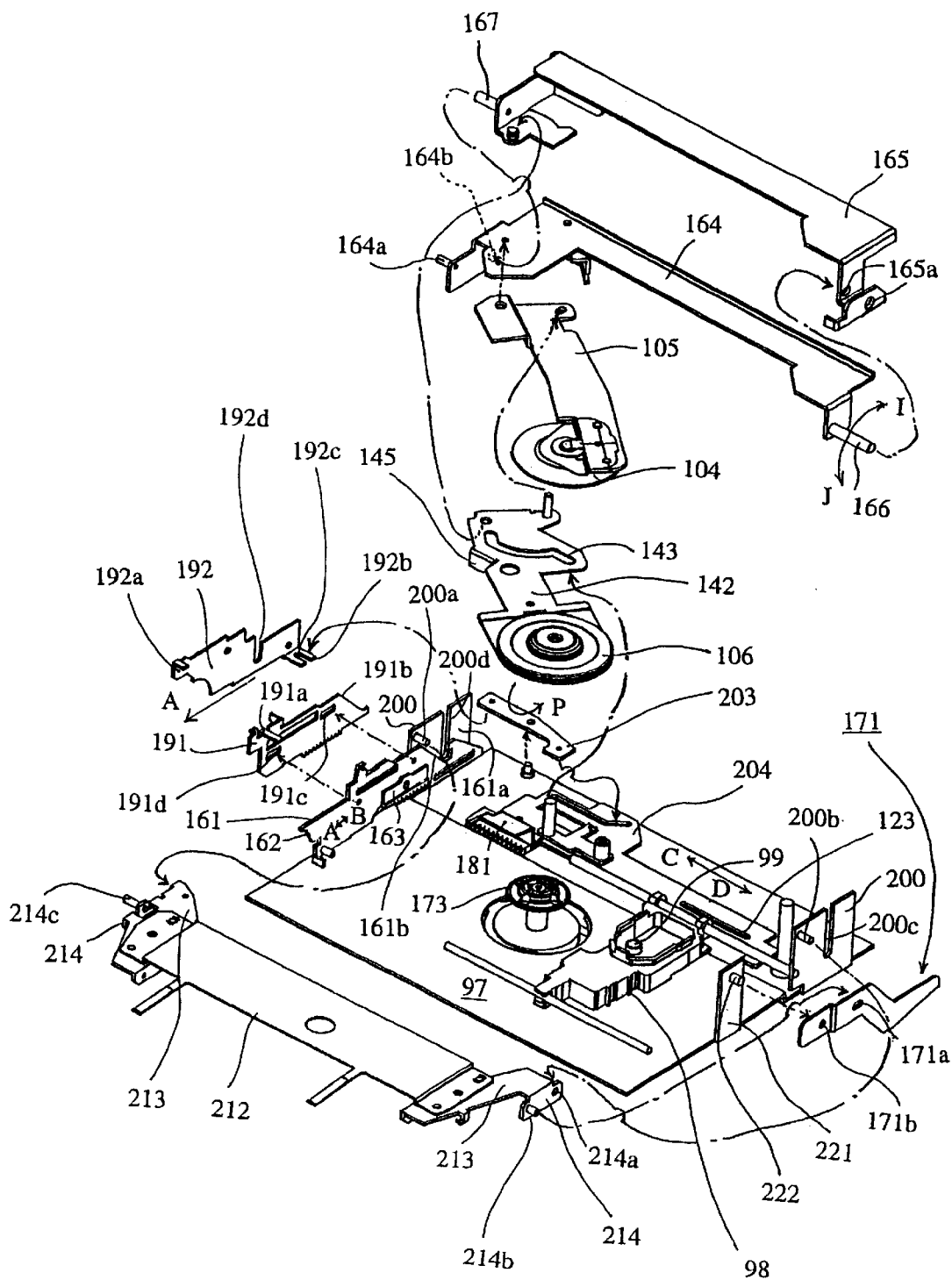
FIG. 36 is an exploded view showing the engaged relationship of the main components of a disk device according to a fourth embodiment of the present invention.
Figure 37:
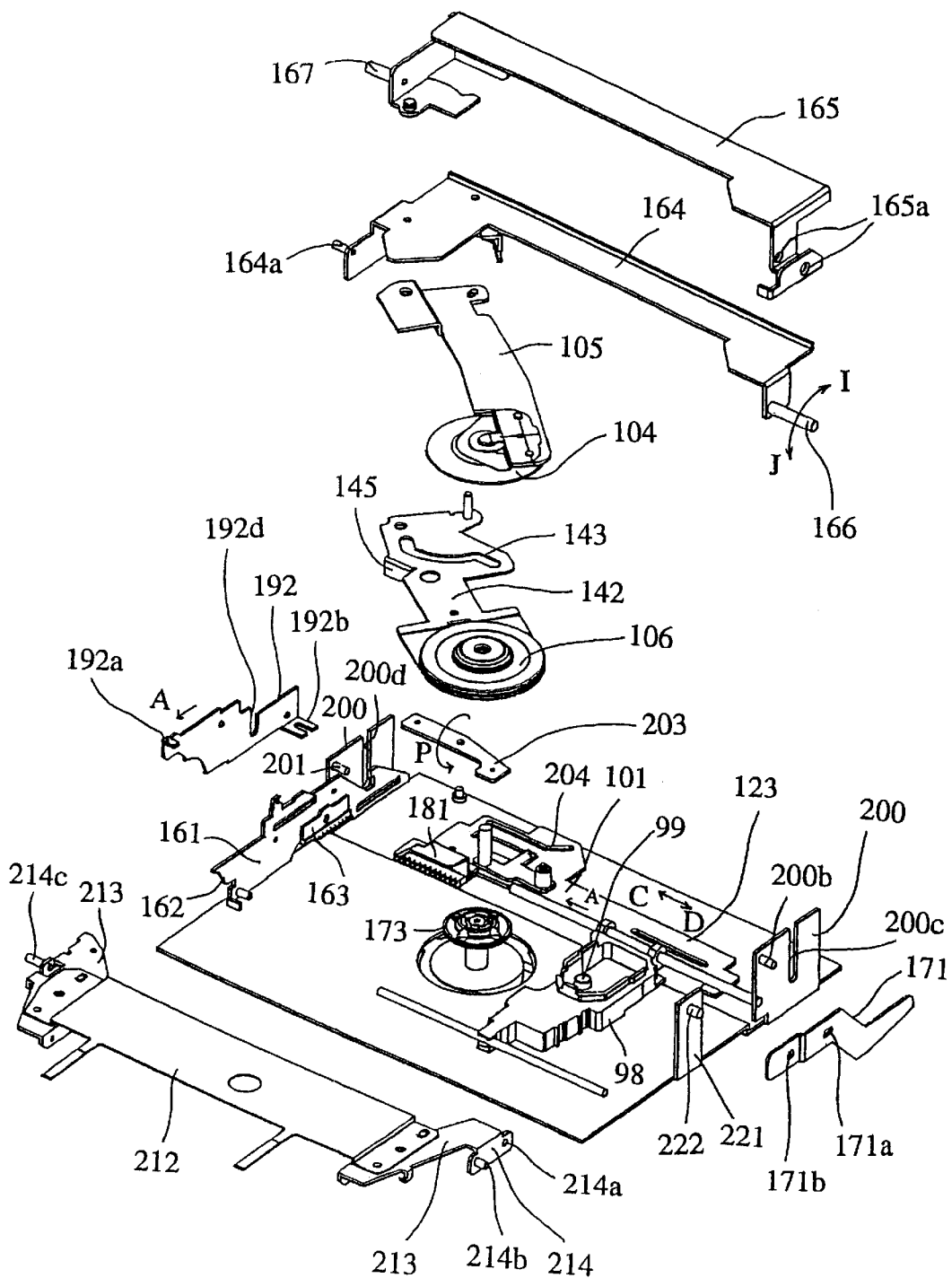
FIG. 37 is an exploded view showing the engaged relationship of the main components of a disk device according to a fourth embodiment of the present invention.

FIG. 36 and FIG. 37 are exploded views showing the engaged relationship of the main components of a disk device according to a fourth embodiment of the present invention.

In the above figures, reference numeral 97 denotes a base chassis, 98 is a carriage, and 99 is an optical pickup which is mounted on the carriage 98.

101 is a drive plate which displaces linearly in the direction C of the arrow when a minidisk is inserted into the disk insertion/ejection mouth and taken up into the device. The linear displacement of the drive plate 101 is initiated by the pressing operation into the device by a user with respect to a minidisk loaded in an MD holder and inserted into the disk insertion/ejection mouth (not shown).

104 is a CD clamp (non-stored recording medium disk clamp), 105 is a CD clamp arm (non-stored recording medium disk clamp arm) on the tip of which the CD clamp 104 is formed, 106 is a CD adapter (non-stored recording medium disk adapter), 107 is a minidisk (case-stored recording medium disk).

110 is a motor which acts as a drive source when a disk is loaded or ejected. 111 is a clutch.

123 is a guide hole formed in the drive plate 101. 124 is a guide pin which engages with the guide hole 123. 142 is a CD adapter arm (non-stored recording medium disk adapter arm) on the tip of which the CD adapter 106 is formed. 143 is a curved guide hole which is formed in proximity to the base of the CD adapter arm 142.

145 is a projection formed in proximity to the base of the CD adapter arm 142 in order to raise the CD adapter arm 142 upwardly. The projection 145 abuts with the cam face section 181 formed on the drive plate 101 shown in FIG. 33, FIG. 35 and FIG. 36. The projection 145 formed in proximity to the base of the CD adapter arm 142 rides on the cam face of the cam face section 181 due to the displacement in the direction of the arrow C of the drive plate 101 on which the cam face section 181 is formed. Thus the CD adapter arm 142 is raised upwardly.

151 is a roller for performing ejection and conveying of compact disks into and out of the device. 152 is a support plate which supports the end of the roller 151 to rotate freely. 153 is a pin which is formed on the support plate 152. 154 is a base flap which is disposed below the roller 151.

161 is a cam flap which displaces in the directions A and B of the arrow. A first inclined cam face 161a and a second inclined cam face 161b are formed as shown in FIG. 25.

162 is a cam face which is formed on the cam flap 161 and which engages with the pin 153 formed on the support plate 152. 163 is a rack member which has a rack which is integrated with the cam flap 161.

164 is a first arm support member which engages with the base of the CD clamp arm 105 and which can rotate in the direction I or J of the arrow. 164a is a clamp limiting pin which is formed on the first arm support member 164. 164b is a hole which is formed on the first arm support member 164.

165 is a second arm support member which engages with the base of the CD adapter arm 142 which can rotate in the direction I or J of the arrow and which forms a hole 165a.

166 is a rotation support shaft which enables rotation of the first arm support member 164 and the second arm support member 165 in the direction I or J of the arrow and which is formed on the first arm support member 164. The rotation support shaft 166 passes through the hole 165a formed in the second arm support member 165 and projects outwardly.

167 is a rotation support shaft which is formed on the second arm support member 165 and which enables rotation of the first arm support member 164 and the second arm support member 165 in the direction I or J of the arrow. The rotation support shaft 167 passes through the hole 164b formed in the first arm support member 164 and projects outwardly.

The rotation of the first arm support member 164 and the second arm support member 165 in the direction I or J of the arrow is respectively enabled by these rotation support shafts 166, 167.

171 is a lever which is engaged at one end with the rotation support shaft 166 and which pivots to allow rotation at the other end. The lever 171 displaces minidisks, loaded onto the MD holder which is guided by the MD holder guide plate (not shown), vertically with respect to the turntable 173.

203 is a link lever which pivots to enable rotation in proximity to a central section.

204 is a guide hole which engages with one end of the link lever 203 and which is formed on the drive plate 101.

In FIG. 24, 180 is a guide pin which is formed on the drive plate 101. The guide pin 180 engages with a curved guide hole 143 which is formed in proximity to the base of the CD adapter arm 142.

In FIG. 25, 191 is an internal displacement body. A bent section 191a which is bent towards the internal section of the device as shown in FIG. 36 is formed on the internal displacement body 136.

In FIG. 36, 192 is an external displacement body. 192a is a bent section which is formed on the external displacement body 192 towards the internal section of the device. The bent section 192a displaces the cam flap 161 in the same way in the direction A of the arrow when the external displacement body 192 displaces in the direction A of the arrow. 192b is a bent section formed on the external displacement body 192 and forms a slit 192c. The slit 192c engages with the other end of the link lever 203.

191b is a cam face which is formed in proximity to the rear end of the internal displacement body 191. 191c is an elongated hole which is formed on the internal displacement body 191. The pin formed on the cam flap 161 displaces in the elongated hole 191c. 191d is an elongated hole formed on the internal displacement body 191. The pin formed on the cam flap 161 displaces in the elongated hole 191d.

200 is a deformed section formed to bend orthogonally upwardly in proximity to the rear end of both sides of the base chassis 97. A pin 200a is formed on the deformed section 200 on the left side of the figure projecting into the device. A pin 200b is formed on the deformed section 200 on the right side of the figure projecting out of the device. A slit 200c is formed on the deformed section 200 on the left side of the figure which engages with the rotation support shaft 166 in a vertical direction and enables the rotation support shaft 166 to displace vertically. A slit 200d is formed on the deformed section 200 on the right side of the figure which engages with the rotation support shaft 167 in a vertical direction and enables the rotation support shaft 167 to displace vertically.

212 is an MD cartridge-elevating member, 213 is a support member which is formed on both ends of the MD cartridge-elevating member 212. The support member 213 on the right side of the figure has a lower deformed section 214 which forms a through hole 214a and a pin 214b. The through hole 214a engages with the pin 200b which is formed on the deformed section 200 on the right side of the figure. The support member 213 on the left side of the figure has a lower deformed section 214 which forms a through hole (not shown) and a MD cartridge-elevating limiting pin 214c. The through hole (not shown) engages with the pin 200a formed on the deformed section 200 on the left of the figure.

221 is a deformed section which is formed in a bent shape orthogonally in an upward direction in proximity to the central section of both edges of the base chassis 97. 222 is a pin which is formed on the deformed section 221. The pin 222 engages rotatably with the through hole 171b formed on the other end of the lever 171. An elongated hole 171a is formed in proximity to the central section of the lever 171. The elongated hole 171a engages with a pin 214b on a support member 213 formed on the right side of the MD cartridge-elevating member 212 in the figure.

The operation of the invention will be described below.

FIG. 38 to FIG. 54 are explanatory figures describing a disk device according to a fourth embodiment of the invention.

Figure 38:
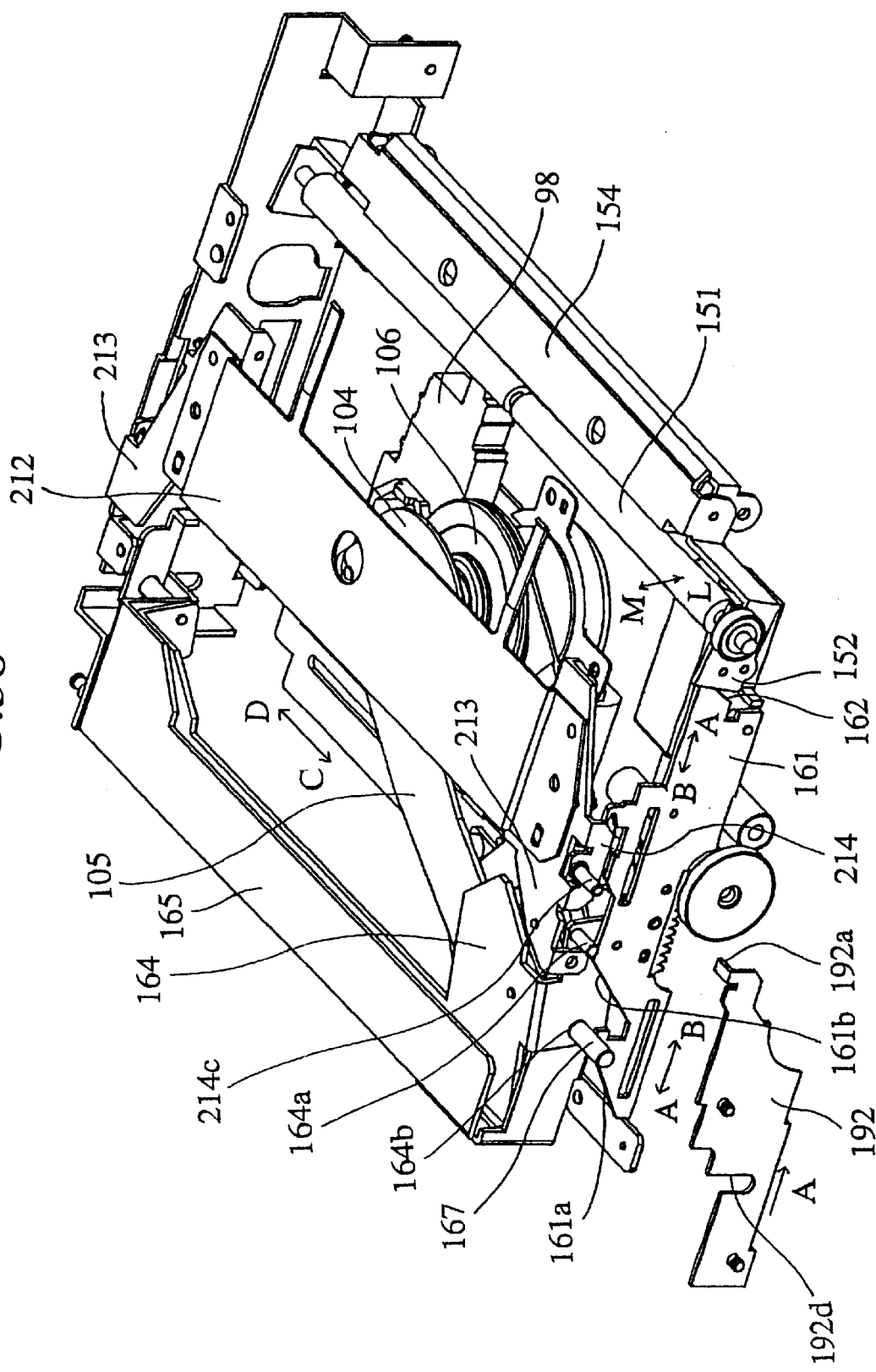
FIG. 38 is a three-dimensional view describing the operation of the left face of a disk device in a ready state according to a fourth embodiment of the present invention.
Figure 39:
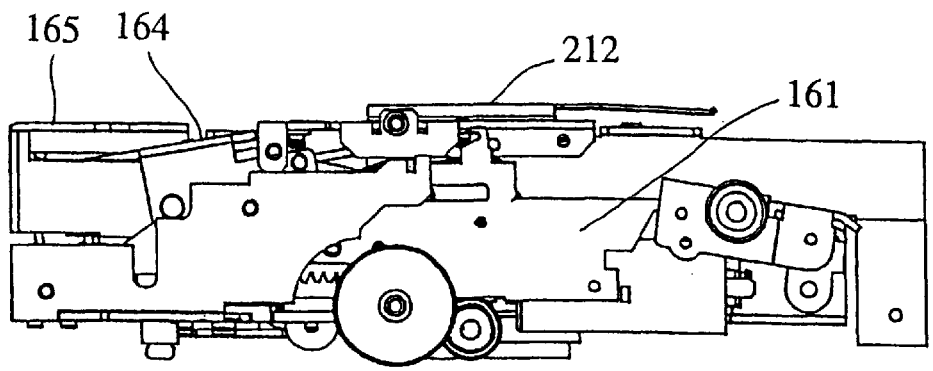
FIG. 39 is a left-side view of FIG. 38.
Figure 41:
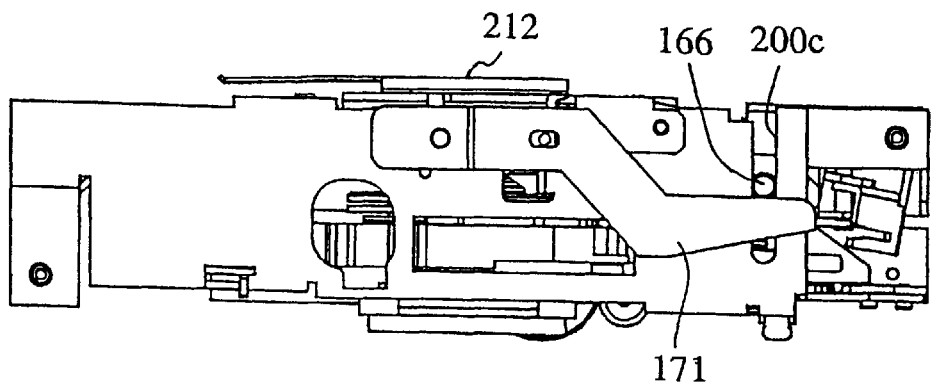
FIG. 41 is a right-side view of FIG. 40.
Figure 40:
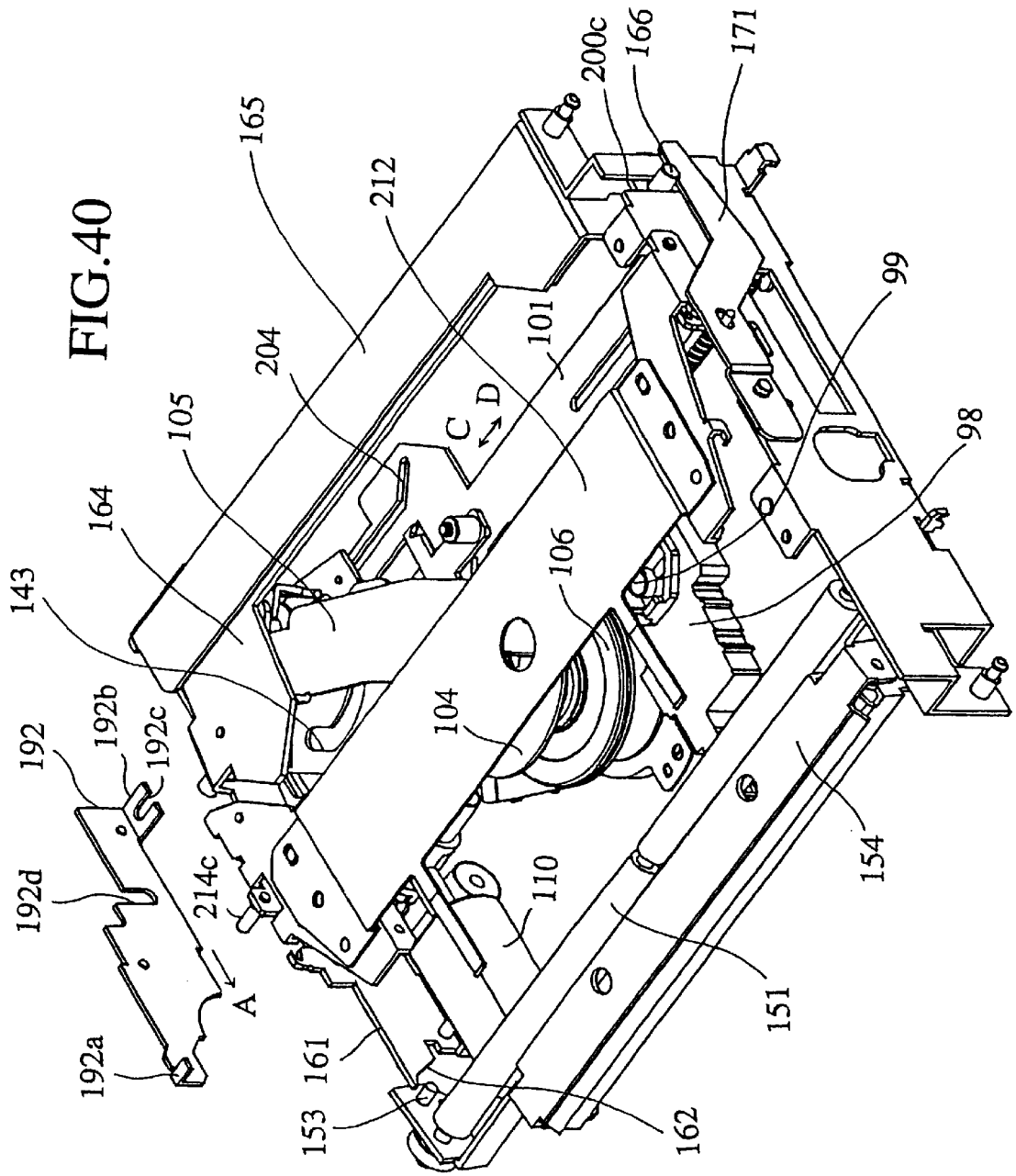
FIG. 40 is a three-dimensional view describing the operation of the right face of a disk device in a ready state according to a fourth embodiment of the present invention.

FIG. 38 to FIG. 41 are explanatory figures describing the ready state of a disk device. FIG. 38 is a three-dimensional view describing the operation of the left face of a disk device in a ready state. FIG. 39 is a left-side view of FIG. 38. FIG. 40 is a three-dimensional view describing the operation of the right face of a disk device in a ready state. FIG. 41 is a right-side view of FIG. 40.

Figure 43:
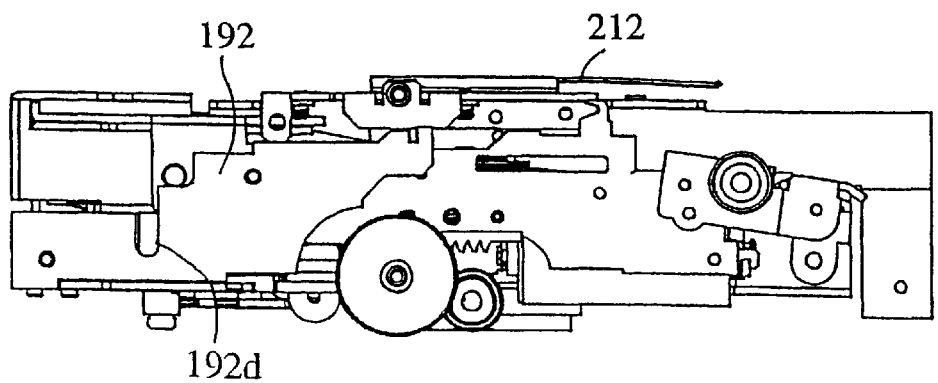
FIG. 43 is a left-side view of FIG. 42.
Figure 42:
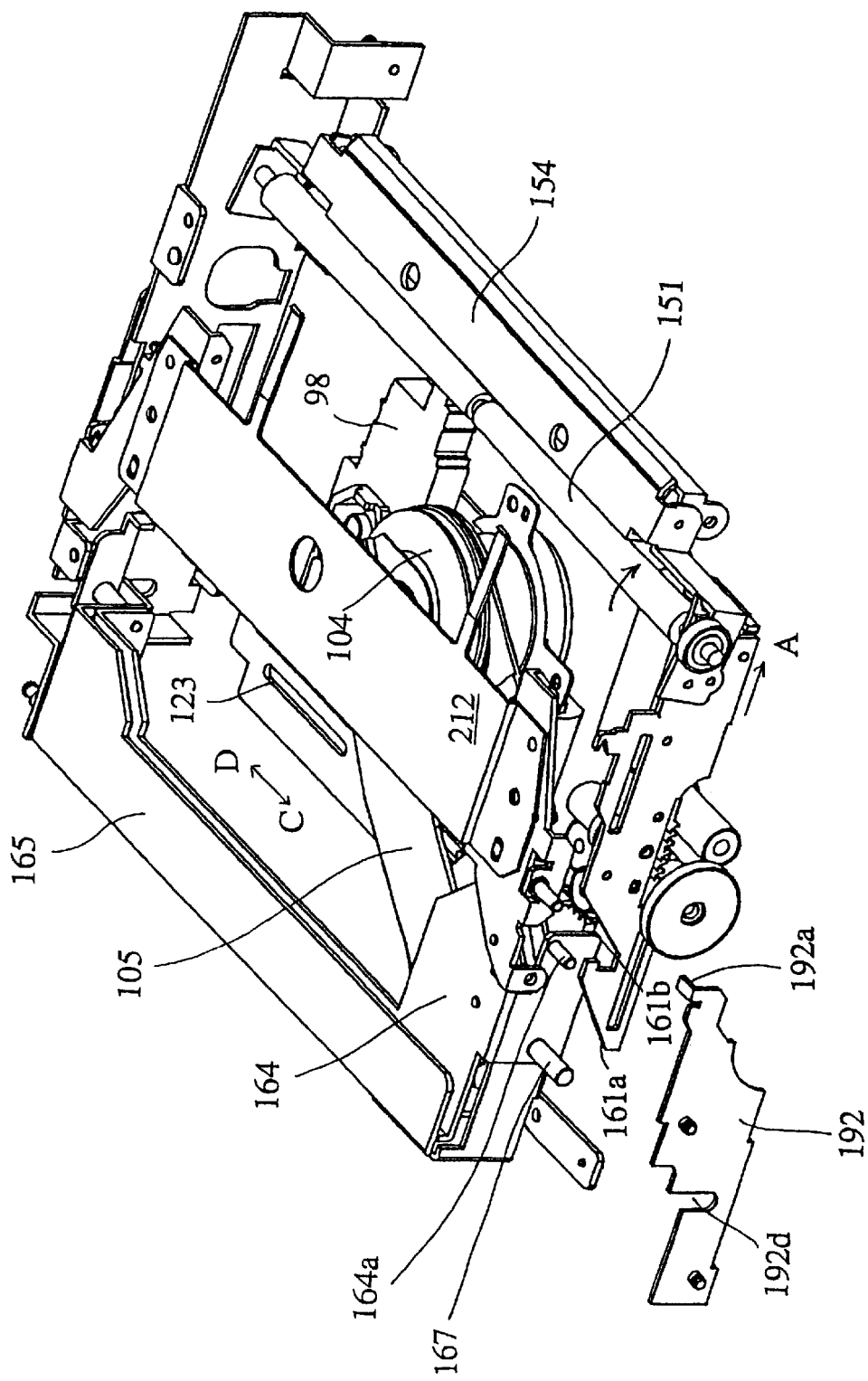
FIG. 42 is a three-dimensional view describing the operation of the left face of a disk device in a clamped state according to a fourth embodiment of the present invention.
Figure 44:
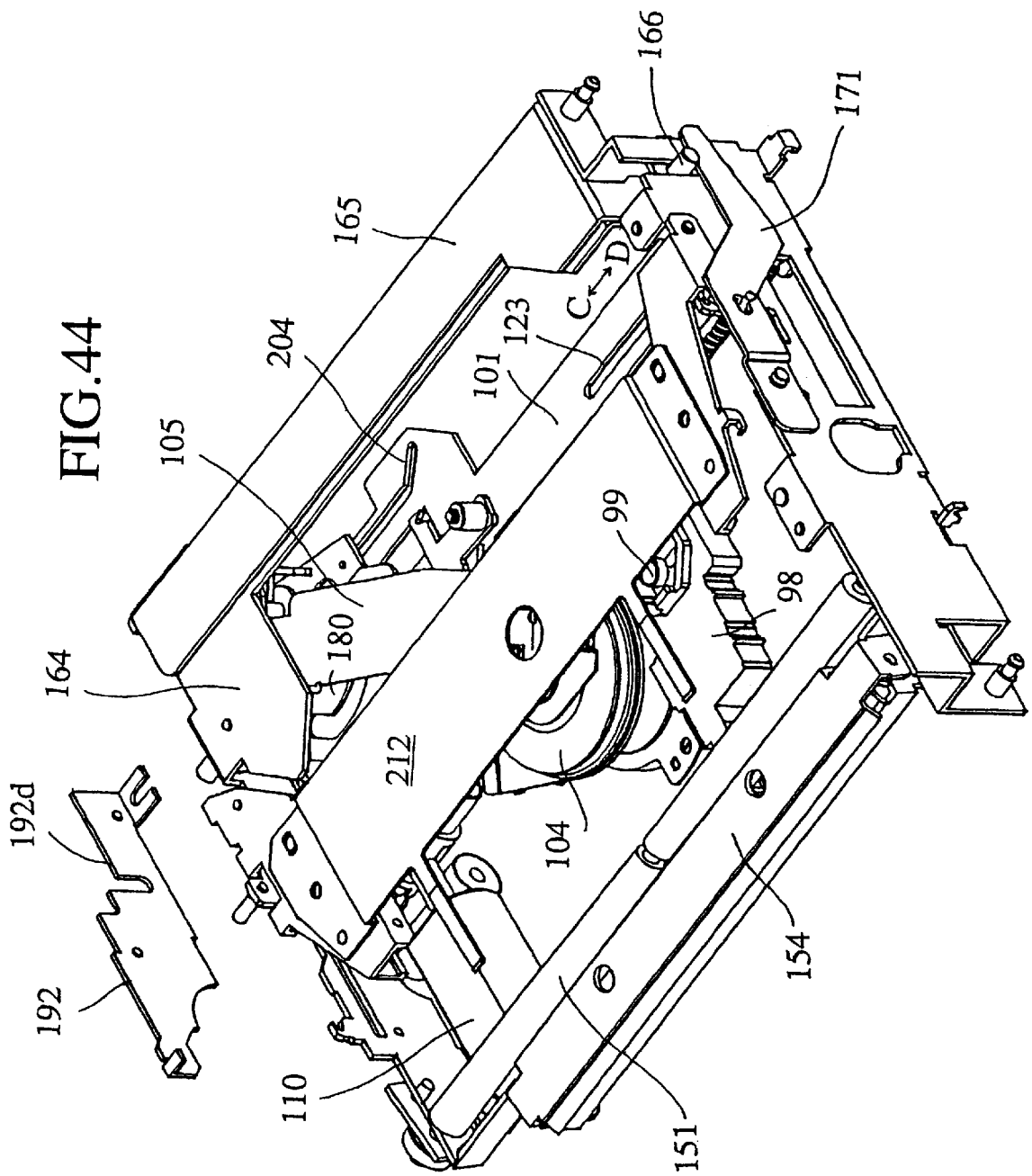
FIG. 44 is a three-dimensional view describing the operation of the right face of a disk device in a ready state according to a fourth embodiment of the present invention.
Figure 45:
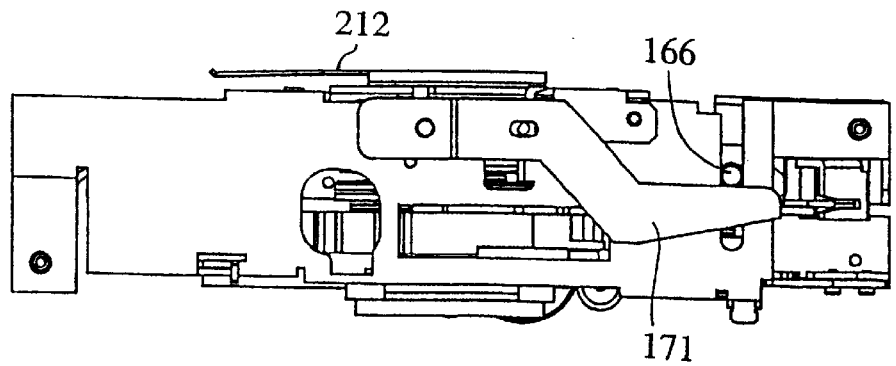
FIG. 45 is a right-side view of FIG. 44.

FIG. 42 to FIG. 45 are explanatory figures describing a disk device when clamped. FIG. 42 is a three-dimensional view describing the operation of the left face of a disk device in a clamped state. FIG. 43 is a right-side view of FIG. 42. FIG. 44 is a three-dimensional view describing the operation of the right face of a disk device in a ready state. FIG. 45 is a right-side view of FIG. 44.

Figure 47:
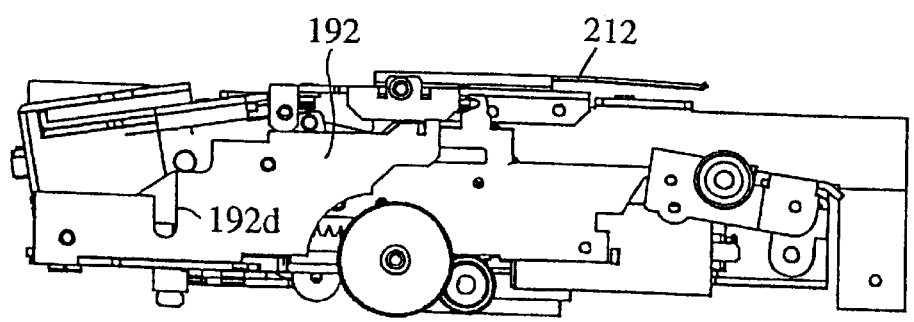
FIG. 47 is a left-side view of FIG. 46.
Figure 49:
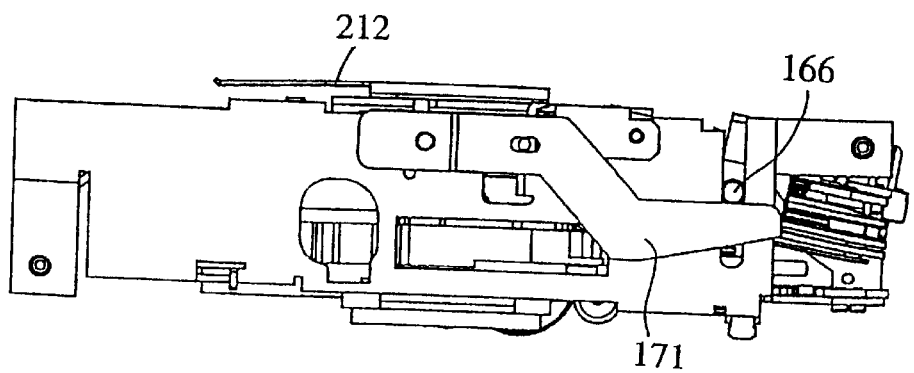
FIG. 49 is a right-side view of Fig. 48.
Figure 46:
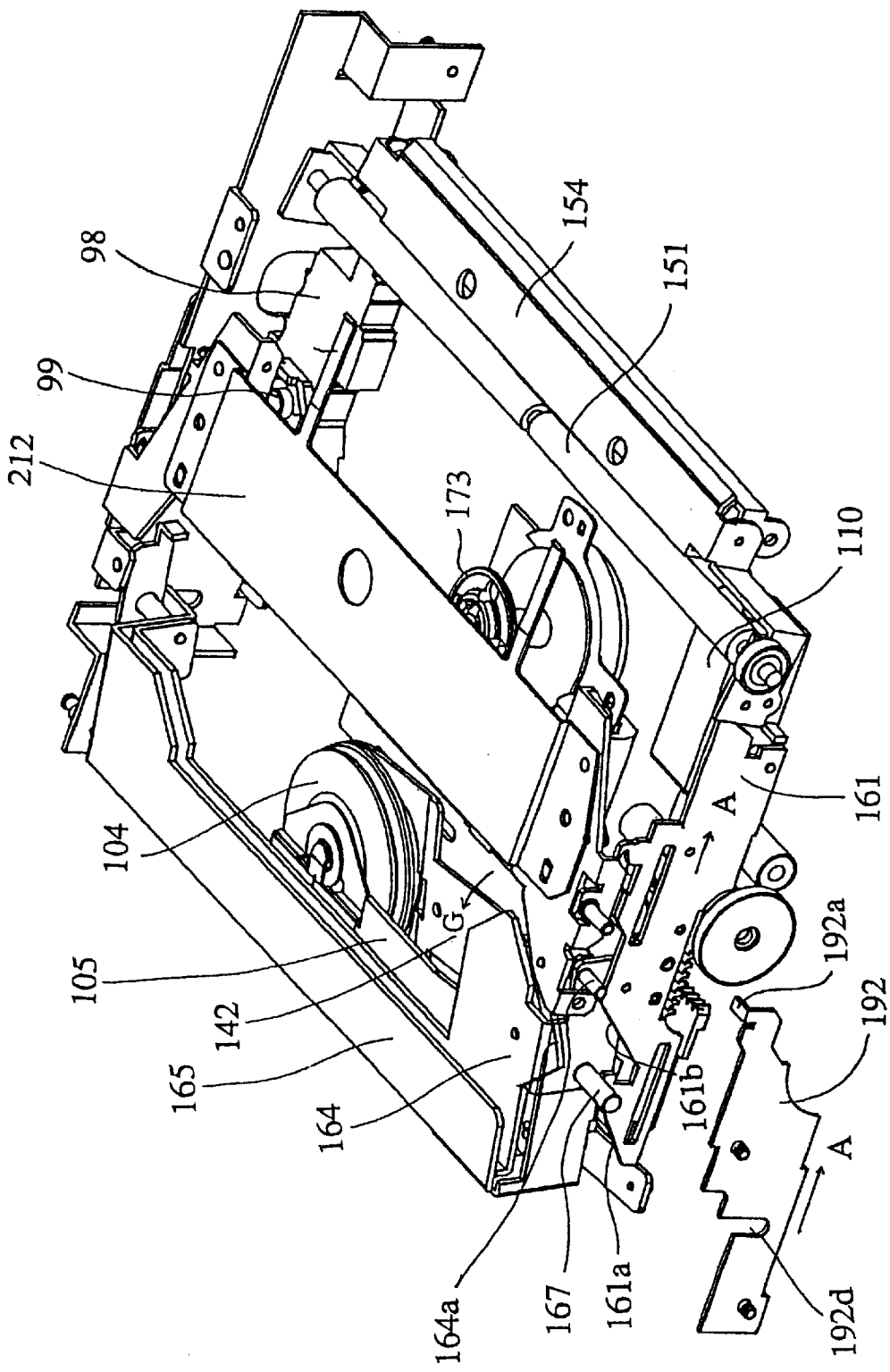
FIG. 46 is a three-dimensional view describing the operation of the left face of a disk device in which the CD clamp arm and CD adapter arm are in a refuged state according to a fourth embodiment of the present invention.
Figure 48:
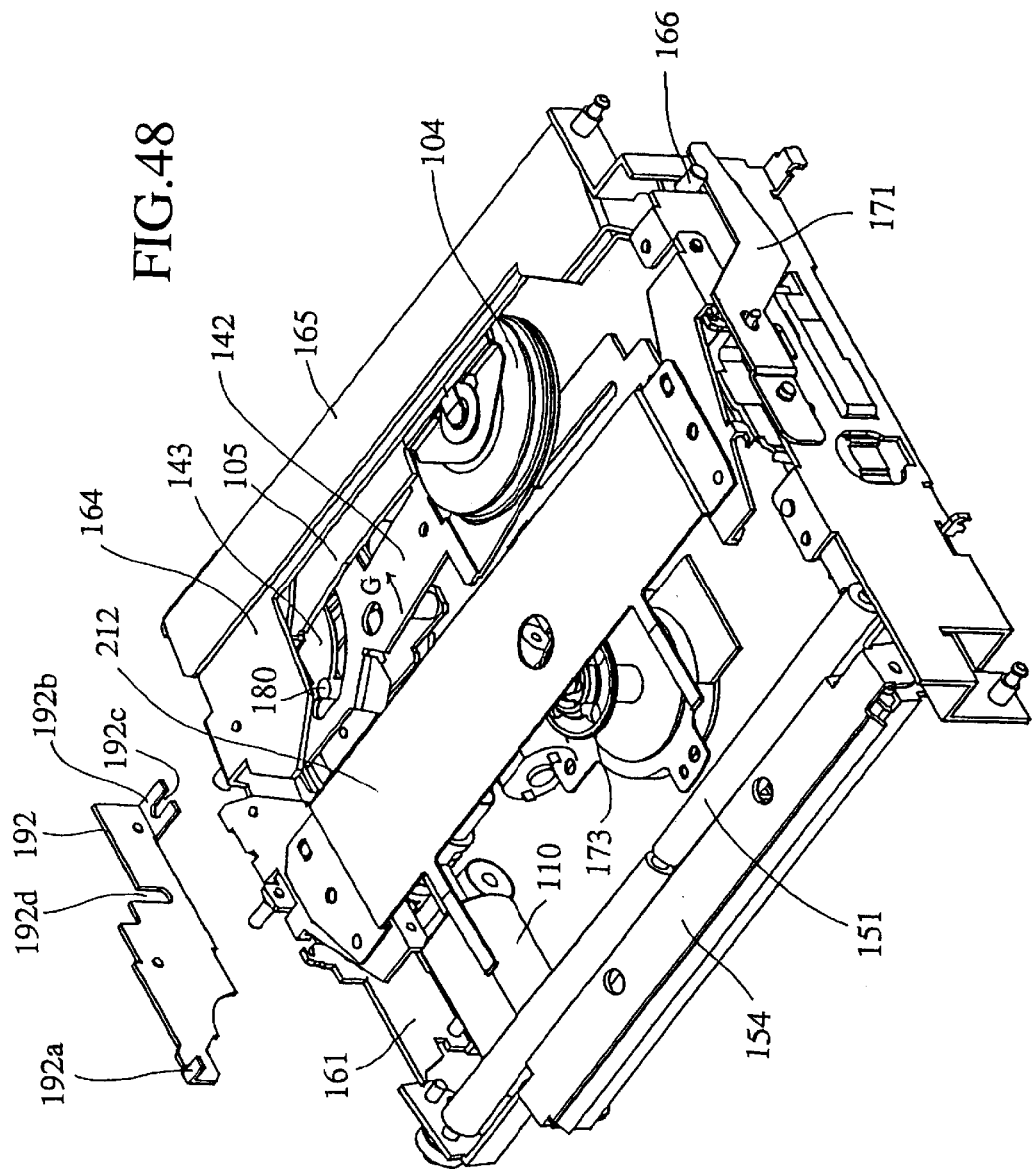
FIG. 48 is a three-dimensional view describing the operation of the right face of a disks device in a refuged state according to a fourth embodiment of the present invention.
Figure 50:
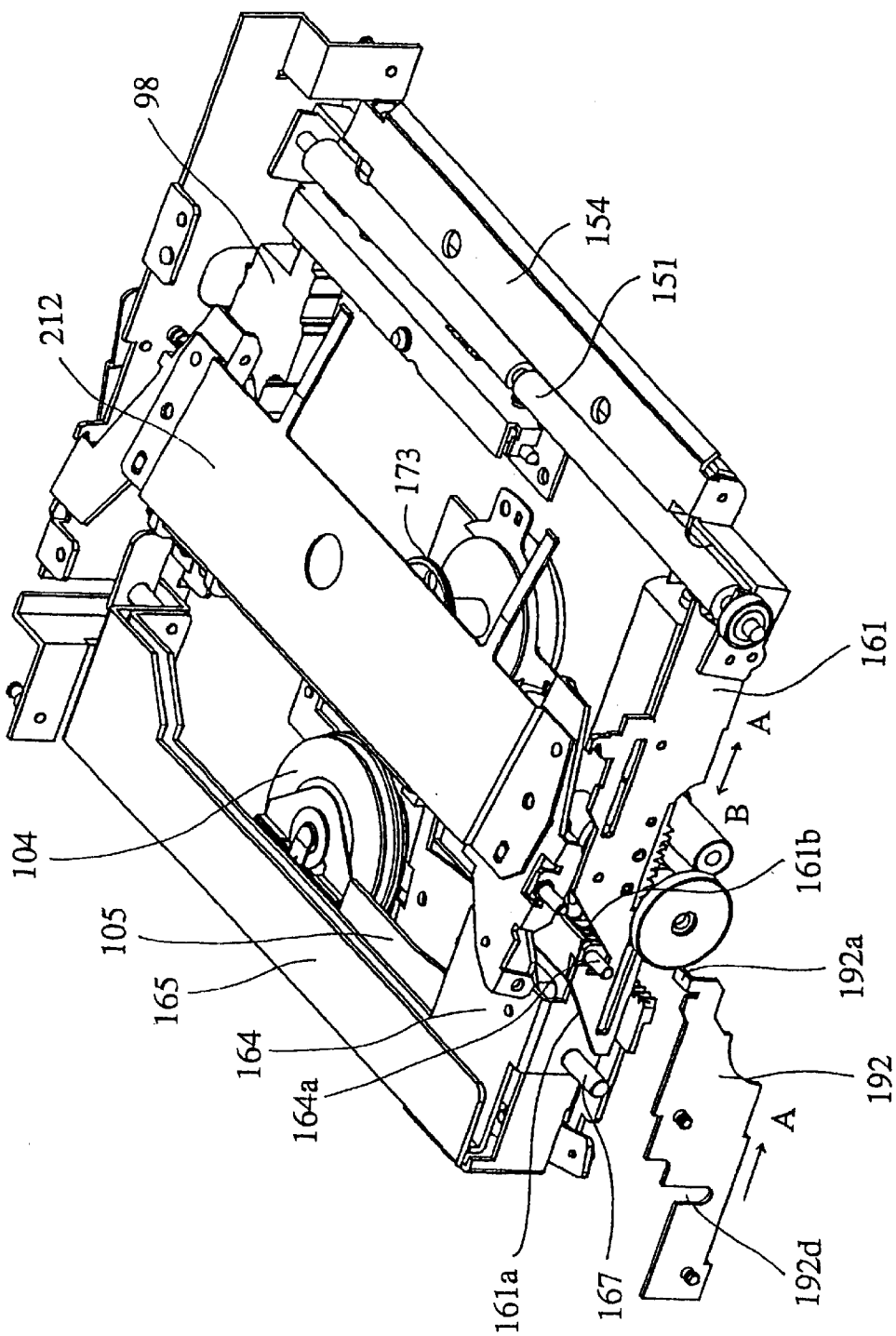
FIG. 50 is an explanatory view describing the disk device in a state in which the CD clamp arm and CD adapter arm which are refuged into the device are lowered in a downward direction according to a fourth embodiment of the present invention.
Figure 51:
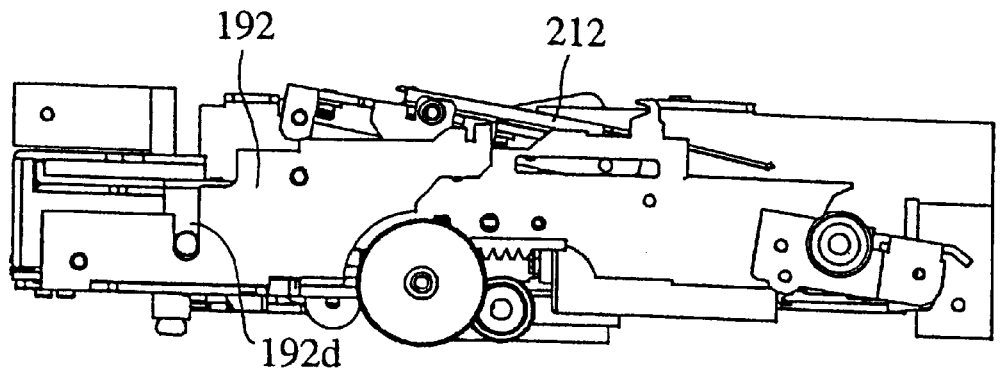
FIG. 51 is a left-side view of FIG. 50.
Figure 53:
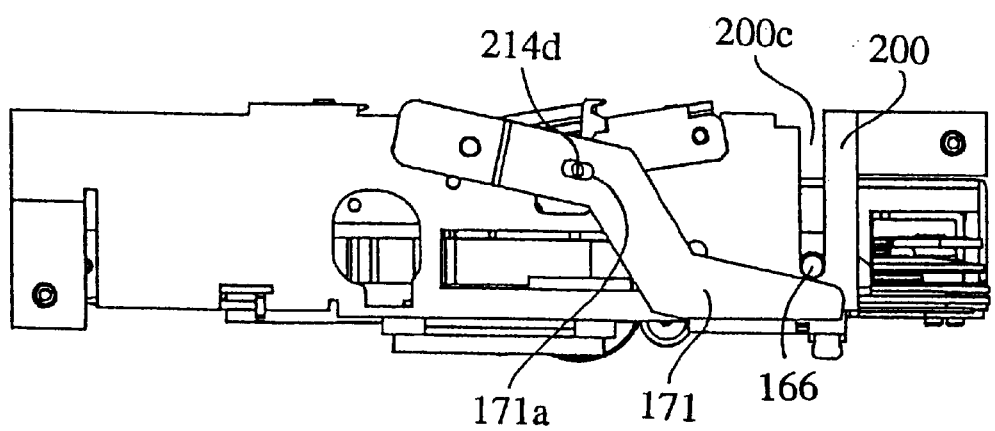
FIG. 53 is a right-side view of FIG. 52.
Figure 52:
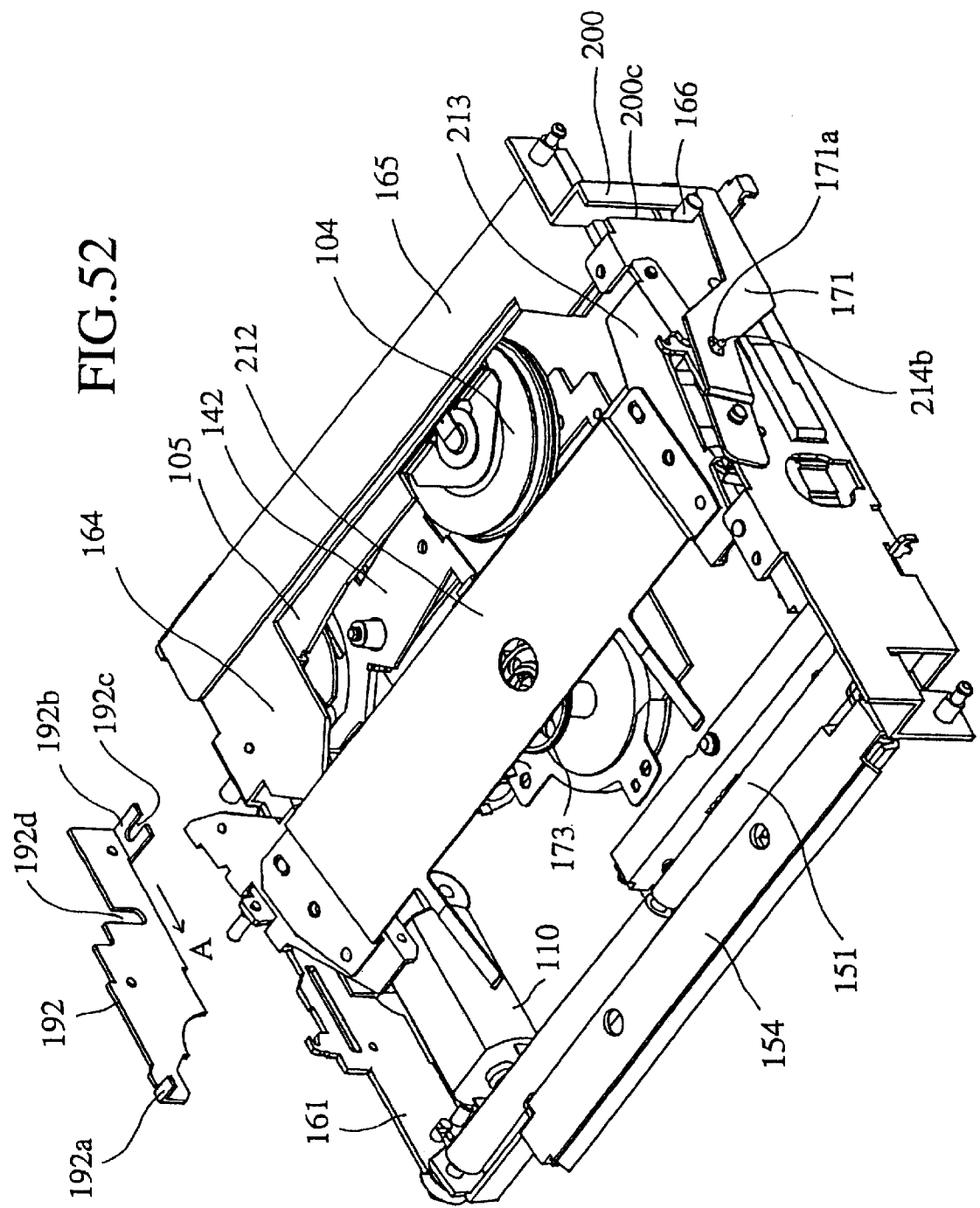
FIG. 52 is an explanatory view describing the disk device in a state in which the CD clamp arm and CD adapter arm which are refuged into the device are lowered in a downward direction according to a fourth embodiment of the present invention.

FIG. 46 to FIG. 53 are explanatory figures describing the operation of a disk device when the CD clamp arm 105 and CD adapter arm 142 are in a refuged state in the disk device. FIG. 46 is a three-dimensional view describing the operation of the left face of a disk device in which the CD clamp arm 105 and CD adapter arm 142 are in a refuged state. FIG. 47 is a left-side view of FIG. 46. FIG. 48 is a three-dimensional view describing the operation of the right face of a disk device in a refuged state. FIG. 49 is a right-side view of FIG. 48. FIG. 50 is an explanatory view describing the disk device in a state in which the CD clamp arm 105 and CD adapter arm 142 which are refuged into the device are lowered in a downward direction. FIG. 51 is a left-side view of FIG. 50. FIG. 52 is an explanatory view describing the disk device in a state in which the CD clamp arm 105 and CD adapter arm 142 which are refuged into the device are lowered in a downward direction and an MD cartridge-elevating member 212 is inclined towards the disk insertion/ejection mouth. FIG. 53 is a right-side view of FIG. 52.

Figure 54:
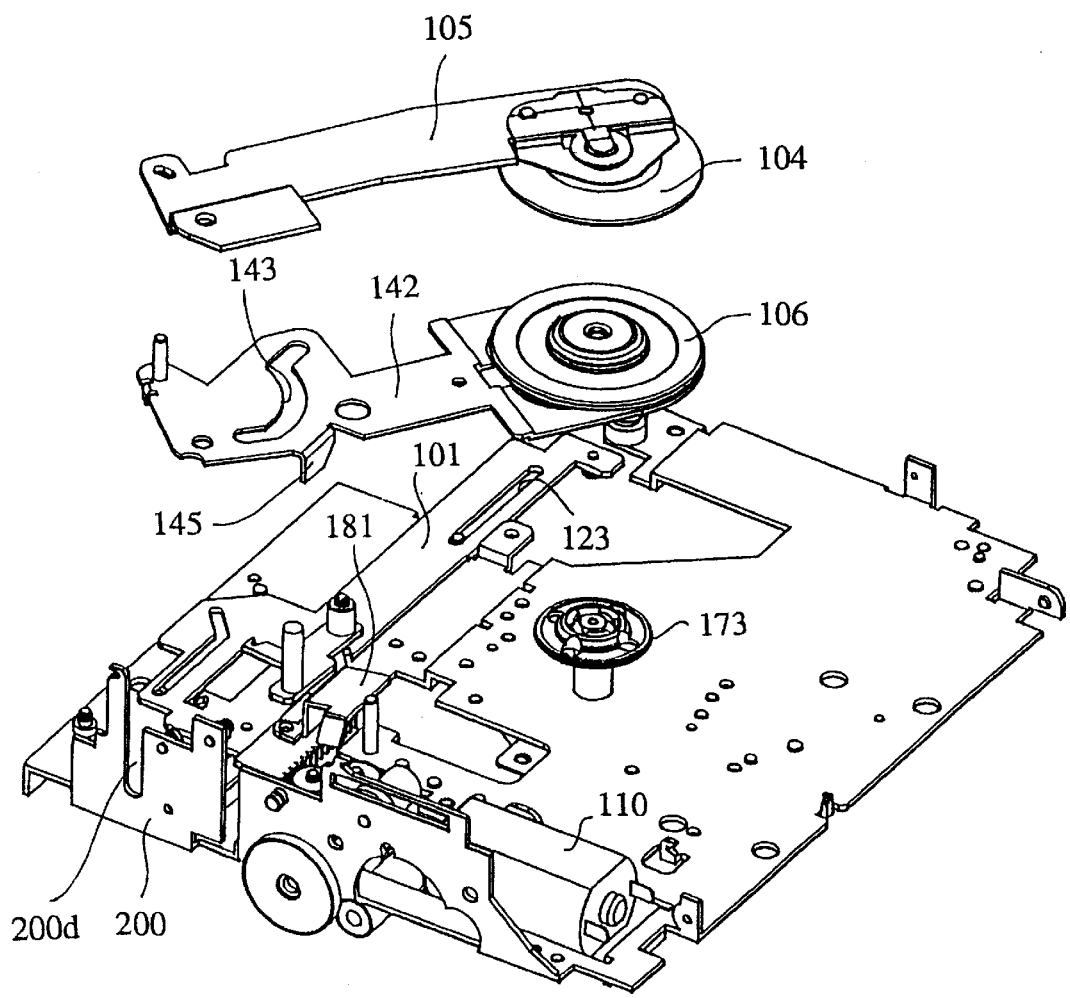
FIG. 54 is a three-dimensional view describing the relationship of the CD clamp, CD adapter and turntable in a disk device according to a fourth embodiment of the present invention.

FIG. 54 is a three-dimensional view describing the relationship of the CD clamp 104, CD adapter 106 and turntable 173 in a disk device.

Firstly the operation of the disk device when in a ready state will be described using FIG. 38 to FIG. 41. In a ready state, the cam flap 161 displaces up to a limiting displacement position in the direction of the arrow B. As a result, as shown in FIG. 38 to FIG. 41, the rotation support shaft 167 which passes through the hole 164b formed on the first arm support member 164 to project outwardly displaces towards a step section on an upper section of the first inclined cam face 161a of the cam flap 161. The clamp limiting pin 164a formed on the second arm support member 165 displaces towards a step section on an upper section of the second inclined cam face 161b of the cam flap 161. As a result, the CD clamp 104 and the CD adapter 106 mutually separate and are raised upwardly to the position of the turntable 173.

In this ready position, when a compact disk is inserted through the disk insertion/ejection mouth, is rotated by the roller 151 and transferred onto the turntable 173 in the (device by the roller 151, the central section of the transferred compact disk mutually separates and is positioned between the CD clamp 104 and the CD adapter 106 which are in an upwardly raised state at the position of the turntable 173. Together with the transfer of the compact disk into the device, as shown in FIG. 42 to FIG. 45, the cam flap 161 displaces in the direction A of the arrow. As a result, the rotation support shaft 167 which displaces to a step section on an upper section of the first inclined cam face 161a of the cam flap 161 slides down the first cam face 161a. The clamp limiting pin 164a which has displaced towards a step section on an upper section of the second inclined cam face 161b of the cam flap 161 slides down the second cam face 161a. Therefore the CD clamp arm 105 and the CD adapter arm 142 are lowered while rotating the tip sections downwardly about the rotating support shafts 166, 167. The CD clamp 104 and the CD adapter 106 are lowered towards the turntable 173. At this time, the CD clamp 104 and the CD adapter 106 which lower towards the turntable 173 are depressed onto the turntable 173 while clamping the center of the compact disk. Thus the loading of the compact disk is performed. The roller 151 displaces to a downward position which does not impede the rotation of the compact disk due to the cam flap 161 which displaces in direction A of the arrow.

In the above ready position, when a minidisk is inserted, the insertion of the minidisk is detected. As a result, the drive plate 101 is driven in direction C of the arrow. When the drive plate 101 displaces in the direction C of the arrow, firstly, the cam face section 181 shown in FIG. 36 and FIG. 37 which is formed on the drive plate 101 abuts with the projection 145 which is formed on the CD adapter arm 142. As a result, the upper face of the CD adapter 106 is layered on the lower face of the CD clamp 104 while the CD adapter arm 142 and the CD clamp arm 105 are raised upwardly. At this time, the first arm support member 164 and the second arm support member 165 incline with the raised side near the turntable 173 and the lowered side towards the inside of the device as shown in FIG. 22.

The guide pin 180 which is formed on the drive plate 101 displaces the CD adapter arm 142 and the CD clamp arm 105 together into the device in the direction G of the arrow as shown in FIG. 46 and FIG. 49 due to the drive plate 101 which displaces in direction C of the arrow. The above displacement results from the displacement of the curved guide hole 143 which is formed in proximity to the base of the CD adapter arm 142. As shown in FIG. 48 and FIG. 49, the CD adapter arm 142 and the CD clamp arm 105 which are displace together into the device (the CD clamp 104 and CD adapter 106 also displace with the CD adapter arm 142 and the CD clamp arm 105) are in an orientation during displacement into the device such that the side near the turntable 173 is raised and the side near the inside of the device is lowered since the first arm support member 164 and the second arm support member 165 are inclined and not in a horizontal state. At this time, the projection 145 formed on the CD adapter arm 142 is separated from the cam face section 181 formed on the drive plate 101.

In this state, the drive plate 101 displaces further in direction C of the arrow and immediately prior to reaching a displacement limit, one end of the link lever 203 which is engaged with the guide hole 204 as shown in FIG. 36 and FIG. 37 is pressed into the device as the direction of the guide hole 204 is curved into the device at that end. As a result, the other end of the link lever 203 rotates in direction P of the arrow as shown in FIG. 36 and FIG. 37 about that support point.

Since the other end of the link lever 203 is engaged with the slit 192c formed on the bent section 192b of the outer displacement body 192, the rotation of the link lever 203 in direction P of the arrow displaces the outer displacement body 192 in direction A of the arrow.

Since the bent section 192a of the outer displacement body 192 is engaged with the cam flap 161, the cam flap 161 is also displaced in the same way in direction A of the arrow when the outer displacement body 192 displaces in direction A of the arrow. The rack on the rack member 163 of the cam flap 161 meshes with the pinion which is driven by the motor 110 and the cam flap 161 displaces further in direction A of the arrow.

As a result, the rotation support shaft 167 which projects towards an outer section of the first arm support member 164 slides down the first inclined cam face 161a of the cam flap 161 and the clamp limiting pin 164a slides down the second inclined cam face 161b of the cam flap 161. The first arm support member 164 and second arm support member 165 which are in an inclined state with the high end near the turntable 173 and the low end towards the inside of the device are regulated to a horizontal orientation as shown in FIG. 50 to FIG. 53. At this time, the rotation support shaft 167 slips into the slit 192d formed in a vertical direction on the outer displacement body 192 as shown in FIG. 50 and the slit 200d of the deformed section 200 shown in FIG. 36 and FIG. 37. The rotation support shaft 166 slips into the slit 200c formed in the deformed section 200 shown in FIG. 36 and FIG. 37.

When the rotation support shaft 166 slips into the slit 200c of the deformed section 200, as shown in FIG. 52, the rotation support shaft 166 presses one end of the lever 171 downwardly and depresses the pin 214b of the support member 213 which is engaged with the elongated hole 171a formed in proximity to the center of the lever 171. As a result, the MD cartridge-elevating member 212 is depressed and a minidisk which is loaded in the MD holder (not shown) is loaded horizontally onto the turntable 173.

At this time, the CD clamp 104 and the CD adapter 106 which are used for loading of a compact disk which has displaced into the device are in a refuged state below the loaded minidisk together with the CD clamp arm 105 and the CD adapter arm 142.

As shown above, according to embodiment 4, when a minidisk is loaded, the CD clamp 104 and the CD adapter 106 which are used for loading of the compact disk displace into the device together with the CD clamp arm 105 and the CD adapter arm 142 and are stored in a refuged state below the loaded minidisk. The above orientation allows reductions in the height and depth of the disk device.

As shown above, the disk device of the present invention is adapted to play compact disks (CD) used as single disks not stored in cartridges and minidisks (MD) which are used in cartridge-stored form.

What is claimed is:

1. A disk device having a first turntable which supports a first disk stored in a cartridge and which transmits a rotational force to the first disk, a second turntable which can be loaded onto and separated from the first turntable, which supports a second disk not stored in a cartridge and which transmits a rotational force to the second disk and, a spindle motor which rotates the first turntable, said disk device comprising:

a retaining arm retaining the second turntable;

a first shaft supporting the retaining arm to reciprocate vertically so that the second turntable is loaded onto or separated from the first turntable;

a second shaft supporting the retaining arm to rotate and refuge in a planar direction;

a drive plate which is driven when said first disk is loaded;

an arm raiser, raising the retaining arm in a first operational period after the initiation of the drive plate and separates the second turntable from the first turntable; and an arm rotator, rotating the retaining arm in a planar direction in a subsequent second operational period of the drive plate and refuges the second turntable to a position which does not impede the playing of said first disk.

2. A disk device having a first turntable which supports a first disk, stored in a cartridge and having a top side and a bottom side, the first turntable transmitting a rotational force to the bottom side of the first disk, a second turntable which can be loaded onto and separated from the first turntable, which supports a second disk not stored in a cartridge and which transmits a rotational force to the second disk and, a spindle motor which rotates the first turntable, said disk device comprising:

a retaining arm retaining the second turntable;

a first shaft supporting the retaining arm to reciprocate vertically so that the second turntable is loaded onto or separated from the first turntable;

a second shaft supporting the retaining arm to rotate and refuge in a planar direction; and an arm depressor depressing the retaining arm and refuging at least a section of the second turntable to a position below said bottom side of said first disk, after the retaining arm has been rotated in a planar direction and the second turntable has been refuged to a position which does not impede the first turntable.

3. A disk device having a first turntable which supports a first disk stored in a cartridge and which transmits a rotational force to the first disk, a second turntable which can be loaded onto and separated from the first turntable, which supports a second disk not stored in a cartridge and which transmits a rotational force to the second disk and, a spindle motor which rotates the first turntable, said disk device comprising:

a retaining arm retaining the second turntable;

a first shaft supporting the retaining arm to reciprocate vertically so that the second turntable is loaded onto or separated from the first turntable;

a second shaft supporting the retaining arm to rotate and refuge in a planar direction;

a clamp arm which retains a clamp, the clamp pressuring and holding said second disk on the second turntable;

a third support shaft which is formed on an end of the clamp arm at a position which approximately corresponds to the second shaft of the retaining arm; and engaging sections provided on the retaining arm and the clamp arm, the engaging sections mutually engaging when the retaining arm is raised.

4. A disk device which loads and ejects a case-stored recording medium disk stored in a disk case and a non-case-stored recording medium disk not stored in a case and used as a single disk, the disks loaded onto and ejected from a turntable not at the same time, the disk device playing either the case-stored recording medium disk or the non-case-stored recording medium disk, said disk device comprising:

a drive plate which displaces in a linear direction when a case-stored recording medium disk loading mechanism draws the case-stored recording medium disk to a fixed position in the device and loads the disk onto a turntable;

a case-stored recording medium disk loading mechanism which draws a case-stored recording medium disk to a fixed position in the device and loads the disk onto a turntable due to the displacement of the drive plate;

a non-case-stored recording medium disk loading mechanism which loads a non-case-stored recording medium disk, taken up to a fixed position in the device, onto a turntable and which supports a non-case-stored recording medium disk clamp and a non-case-stored recording medium disk adapter respectively to displace vertically and rotate;

a cam mechanism which layers the non-case-stored recording medium disk clamp and the non-case-stored recording medium disk adapter together due to linear displacement of the drive plate;

a depth displacement mechanism which, together with the displacement of the drive plate, displaces the non-case-stored recording medium disk clamp and the non-case-stored recording medium disk adapter layered together by the cam mechanism, in a direction into the device so as not to impede loading of a case-stored recording medium disk onto a turntable; and a refuge mechanism which displaces and refuges the non-case-stored recording medium disk clamp and the non-case-stored recording medium disk adapter, which are displaced into the device by the depth displacement mechanism, in a direction lower than the case-stored recording medium disk loaded onto a turntable.

5. A disk device as claimed in claim 4, wherein said drive plate initiates linear displacement due to an insertion operation into the device of a case-stored recording medium disk through a disk insertion/ejection mouth, the case-stored recording medium disk being loaded onto a case-stored recording medium disk holder.

6. A disk device as claimed in claim 5, wherein a cam mechanism raises a non-case-stored recording medium disk adapter upwardly and layers the adapter together with a non-case-stored recording medium disk clamp due to the linear displacement of the drive plate.

7. A disk device as claimed in claim 6, wherein the cam mechanism comprises:

a cam face forming section and a projection, the cam face forming section being formed on the drive plate performing linear displacement, the projection being provided at a position which can abut with the cam face forming section in proximity to the base of a non-case stored recording medium disk adapter arm on the tip of which the non-case stored recording medium disk adapter is formed.

8. A disk device as claimed in claim 7, wherein the depth displacement mechanism is provided with a pin formed on the drive plate which performs linear displacement and a guide hole which engages with the pin, the guide hole displaces the non-case-stored recording medium disk clamp and non-case-stored recording medium disk adapter, which are layered together by the linear displacement of the drive plate, into the device and is formed in proximity to the base of the non-case-stored recording medium disk adapter arm.

9. A disk device as claimed in claim 7, wherein said non-case-stored recording medium disk loading mechanism comprises:

a first arm support member which supports the non-case-stored recording medium disk clamp to displace vertically and rotate; and a second arm support member which supports the non-case-stored recording medium disk adapter to displace vertically and rotate and which shares a rotation shaft with the first arm support member, and wherein said refuge mechanism comprises:

an outer displacement body which displaces towards the disk insertion/ejection mouth from within the device at the end of the linear displacement of the drive plate; and a cam flap which displaces and refuges the non-case-stored recording medium disk adapter and non-case-stored recording medium disk clamp which are displaced into the device to a position lower than the case-stored recording medium disk which is loaded onto the turntable when the position of the rotation shaft shared by the first and second arm support members is lowered and displaces towards the disk insertion/ejection mouth from within the device due to the linear displacement of the outer displacement body.

10. A disk device as claimed in claim 6, wherein the depth displacement mechanism is provided with a pin formed on the drive plate which performs linear displacement and a guide hole which engages with the pin, the guide hole displaces the non-case-stored recording medium disk clamp and non-case-stored recording medium disk adapter, which are layered together by the linear displacement of the drive plate, into the device and is formed in proximity to the base of a non-case-stored recording medium disk adapter arm.

* * * * *